(12) United States Patent
Moon et al.

(10) Patent No.: US 7,657,114 B2
(45) Date of Patent: Feb. 2, 2010

(54) DATA PROCESSING APPARATUS, DATA PROCESSING METHOD, AND PROGRAM

(75) Inventors: Hoshin Moon, Tokyo (JP); Hiroaki Yamajo, Tokyo (JP); Kazuhiko Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 655 days.

(21) Appl. No.: 11/504,041

(22) Filed: Aug. 15, 2006

(65) Prior Publication Data

US 2007/0110329 A1     May 17, 2007

(30) Foreign Application Priority Data

Aug. 18, 2005   (JP)   .......................... P2005-237575

(51) Int. Cl.
*G06K 9/40*   (2006.01)
(52) U.S. Cl. .................. 382/260; 382/264; 382/274; 382/275; 358/3.26; 358/3.27; 358/463
(58) Field of Classification Search ................ 382/260, 382/263, 264, 274, 275
See application file for complete search history.

(56) References Cited

U.S. PATENT DOCUMENTS 6,842,538 B2 *  1/2005  Lee et al. .................... 382/224
6,859,565 B2 *  2/2005  Baron ......................... 382/275
7,003,173 B2 *  2/2006  Deshpande .................. 382/261
7,003,174 B2 *  2/2006  Kryukov et al. ............. 382/266
7,027,662 B2 *  4/2006  Baron ......................... 382/275

FOREIGN PATENT DOCUMENTS

JP        2001-298621       10/2001

* cited by examiner

*Primary Examiner*—Yosef Kassa
(74) *Attorney, Agent, or Firm*—Finnegan, Henderson, Farabow, Garrett & Dunner, L.L.P.

(57) ABSTRACT

A data processing apparatus for processing image data includes a variance information calculator configured to calculate variance information indicating the degree of variance of pixel values for each of a plurality of pixels constituting the image data; a smoothing section configured to smooth the variance information and to output a smoothed value; a determination section configured to determine an area to which the pixel belongs on the basis of the smoothed value and to output area information indicating the area; a parameter determination section configured to determine a parameter for a noise removal process for each of the pixels constituting the image data on the basis of the area information and the smoothed value; and a noise removal section configured to perform the noise removal process on the image data on the basis of the parameter determined for each of the pixels.

6 Claims, 14 Drawing Sheets

PIXEL OF INTEREST

| C[1](-3) | C[1](-2) | C[1](-1) | C[1](0) | C[1](1) | C[1](2) | C[1](3) |
| --- | --- | --- | --- | --- | --- | --- |
| C[2](-3) | C[2](-2) | C[2](-1) | C[2](0) | C[2](1) | C[2](2) | C[2](3) |
| C[3](-3) | C[3](-2) | C[3](-1) | C[3](0) | C[3](1) | C[3](2) | C[3](3) |
| C[4](-3) | C[4](-2) | C[4](-1) | C[4](0) | C[4](1) | C[4](2) | C[4](3) |
| C[5](-3) | C[5](-2) | C[5](-1) | C[5](0) | C[5](1) | C[5](2) | C[5](3) |

21

| hist(1)>th1 | hist(2)>th2 | hist(3)>th3 | AREA |
|---|---|---|---|
| 1 | x | x | EDGE AREA |
| 0 | 1 | x | TEXTURE AREA |
| 0 | 0 | 1 | FLAT AREA |
| else ||| ANOTHER AREA |

FIG. 10
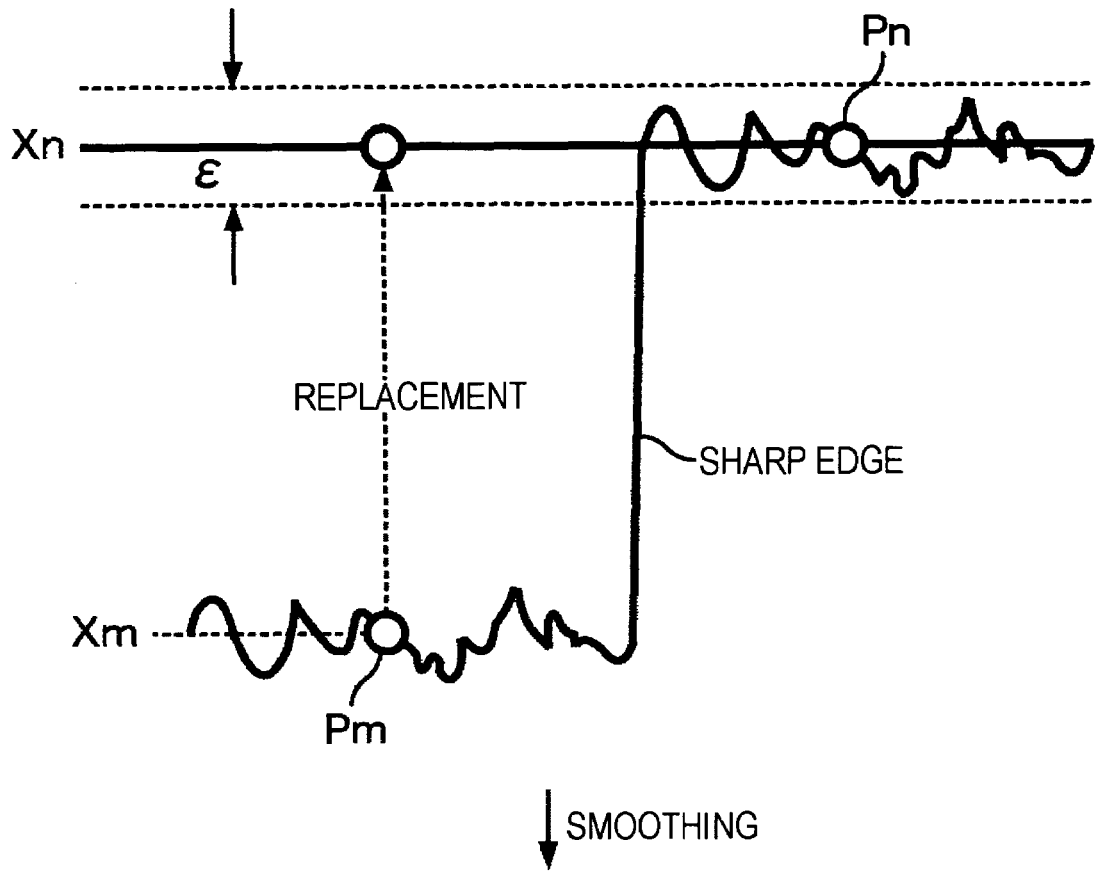
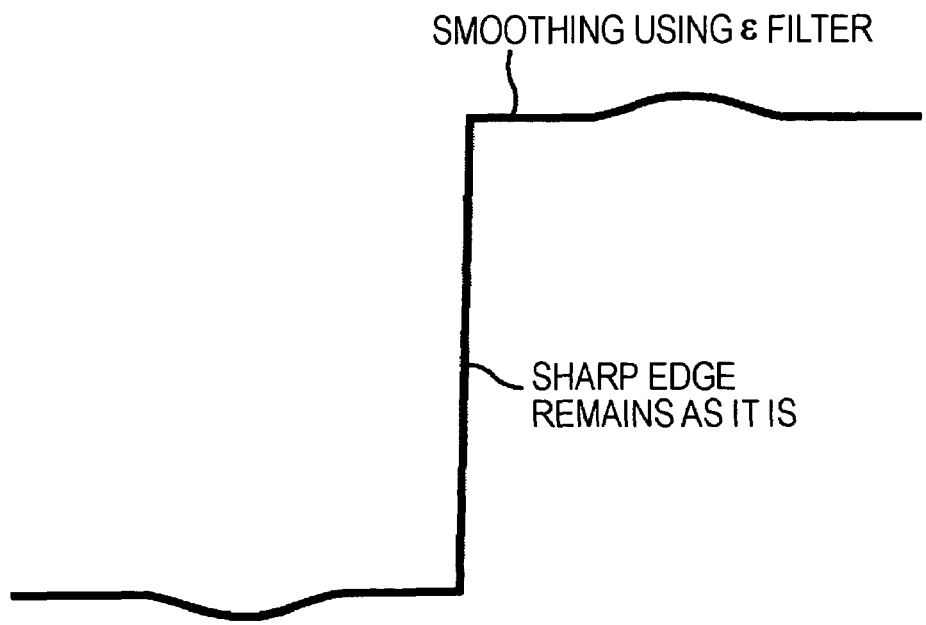

DATA PROCESSING APPARATUS, DATA PROCESSING METHOD, AND PROGRAM

CROSS REFERENCES TO RELATED APPLICATIONS

The present invention contains subject matter related to Japanese Patent Application JP 2005-237575 filed in the Japanese Patent Office on Aug. 18, 2005, the entire contents of which are incorporated herein by reference.

BACKGROUND OF THE INVENTION

1. Field of the Invention

The present invention relates to a data processing apparatus, a data processing method, and a program. More particularly, the present invention relates to a data processing apparatus capable of, for example, effectively removing mosquito noise from image data, to a data processing method for use with the data processing apparatus, and to a program for use with the data processing method.

2. Description of the Related Art

An encoder that compresses image data by using a compression method, such as based on the MPEG (Moving Picture Experts Group) format for compressing image data, divides image data into blocks, and performs a DCT (Discrete Cosine Transform) process on each block. For this reason, when a decoder decodes image data encoded using an MPEG system, theoretically, mosquito noise can be present around edges of images of the decoded image data.

In general, a noise removal apparatus of the related art for removing mosquito noise detects changes in pixel values of image data and determines that the pixel values correspond to the edge if the changes in pixel values are large. Then, the noise removal apparatus filters the edges of images of the image data so that the degree of smoothing thereof becomes higher than that of filtering with respect to portions other than the edges. As a result, mosquito noise that occurs around the edges of images of the image data is removed.

An apparatus for improving contrast of images by using a non-linear smoothing filter for amplifying image data in portions other than edges while maintaining edges whose changes in pixel values are high has been disclosed (refer to, for example, Japanese Unexamined Patent Application Publication No. 2001-298621).

SUMMARY OF THE INVENTION

However, in the noise removal apparatus of the related art, when image data has edges and also a significant degree of texture (for example, a portion where a certain degree of changes in the pixel values of the image data is present because, for example, a pattern exists), it has been difficult to appropriately discriminate between edges of an image and a portion with a significant degree of texture. That is, in the noise removal apparatus of the related art, when a certain degree of changes in the pixel values is detected, it has been difficult to appropriately make a determination as to whether the changes in the pixel values are caused by edges of an image or a portion with a significant degree of texture. For example, there are cases in which, even when changes in the pixel values due to significant texture are detected, the noise removal apparatus of the related art erroneously determines that the changes in pixel values correspond to an edge of an image.

As described above, when discrimination between edges of an image and a portion with a significant degree of texture is not appropriately made, the noise removal apparatus performs filtering of the edges of images and portions with a significant degree texture at an identical degree of smoothing. In that case, for example, there are cases in which the image quality of the portion with a significant degree of texture deteriorates and mosquito noise around the edges of images is not sufficiently removed.

The present invention has been made in view of such circumstances. It is desirable to be capable of effectively removing mosquito noise from image data.

According to an embodiment of the present invention, there is provided a data processing apparatus including: variance information calculation means for calculating variance information indicating the degree of variance of pixel values for each of a plurality of pixels constituting the image data; smoothing means for smoothing the variance information and for outputting a smoothed value; determination means for determining an area to which the pixel belongs on the basis of the smoothed value and for outputting area information indicating the area; parameter determination means for determining a parameter for a noise removal process for each of the pixels constituting the image data on the basis of the area information and the smoothed value; and noise removal means for performing the noise removal process on the image data on the basis of the parameter determined for each of the pixels.

According to another embodiment of the present invention, there is provided a data processing method including the steps of: calculating variance information indicating the degree of variance of pixel values for each of a plurality of pixels constituting the image data; smoothing the variance information and outputting a smoothed value; determining an area to which the pixel belongs on the basis of the smoothed value and outputting area information indicating the area; determining a parameter for a noise removal process for each of a plurality of pixels constituting the image data on the basis of the area information and the smoothed value; and performing the noise removal process on the image data on the basis of the parameter determined for each of the pixels.

According to another embodiment of the present invention, there is provided a program including the steps of: calculating variance information indicating the degree of variance of pixel values for each of a plurality of pixels constituting the image data; smoothing the variance information and outputting a smoothed value; determining an area to which the pixel belongs on the basis of the smoothed value and outputting area information indicating the area; determining a parameter for a noise removal process for each of the pixels constituting the image data on the basis of the area information and the smoothed value; and performing the noise removal process on the image data on the basis of the parameter determined for each of the pixels.

In the data processing apparatus, the data processing method, and the program according to the embodiments of the present invention, variance information indicating the degree of variance of pixel values is calculated for each of a plurality of pixels constituting image data, and smoothed values in which variance information has been smoothed are output. Furthermore, an area to which the pixel belongs is determined on the basis of the smoothed value, and area information indicating that area is output. Then, on the basis of the area information and the smoothed value, a parameter for a noise removal process is determined for each pixel constituting the image data, and on the basis of the parameter determined for each pixel, the noise removal process is performed on the image data.

According to the embodiments of the present invention, mosquito noise can be effectively removed from image data.

BRIEF DESCRIPTION OF THE DRAWINGS

FIG. 10 illustrates filtering by an $\epsilon$ filter;

DESCRIPTION OF THE PREFERRED EMBODIMENTS

Figure 1:
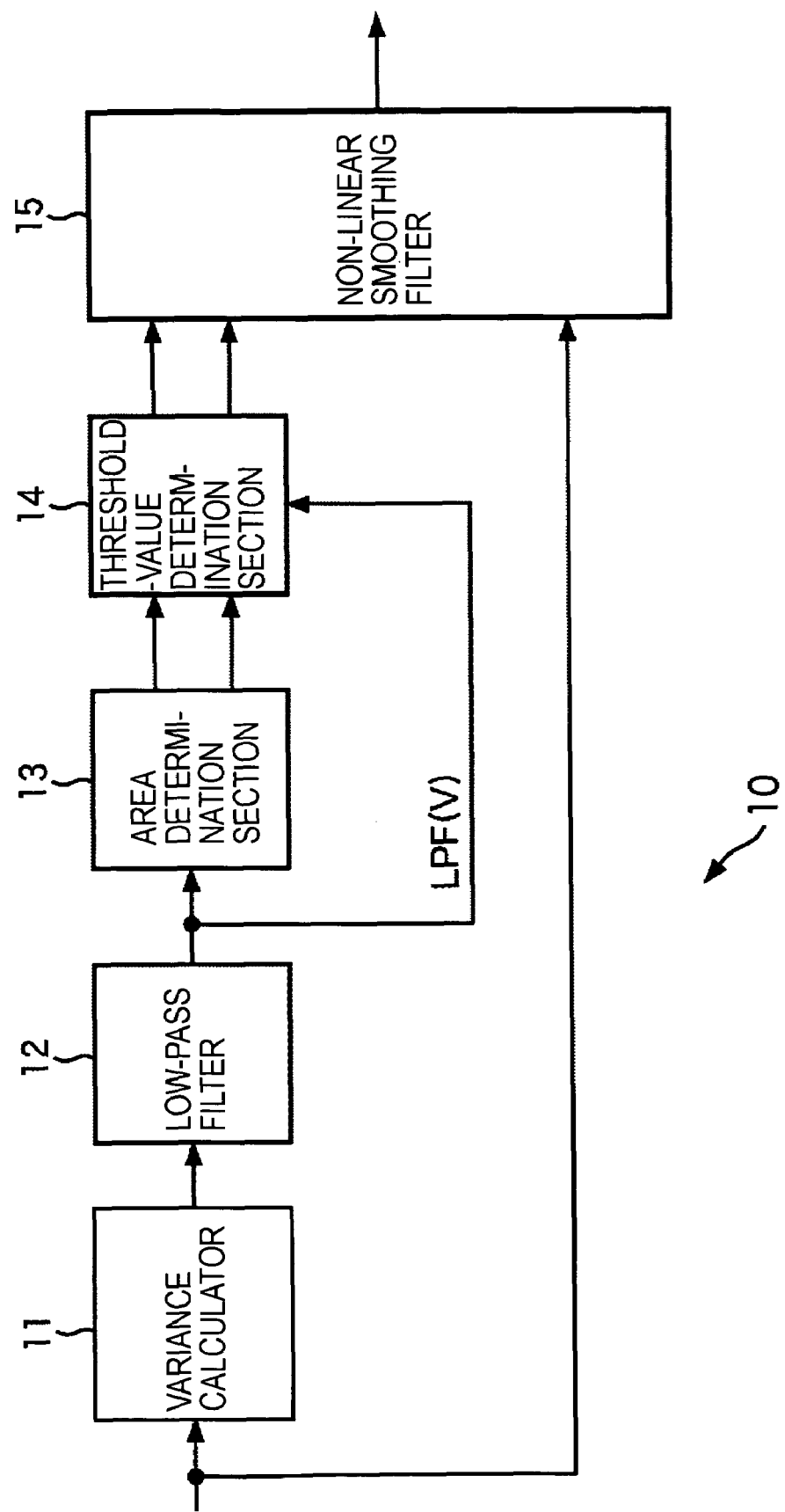
FIG. 1 is a block diagram showing an example of the configuration of an embodiment of a noise removal apparatus to which the present invention is applied.

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

The data processing apparatus according to an embodiment of the present invention includes variance information calculation means (for example, a variance calculator 11 of FIG. 1) for calculating variance information indicating the degree of variance of pixel values for each of a plurality of pixels constituting the image data; smoothing means (for example, a low-pass filter 12 of FIG. 1) for smoothing the variance information and for outputting a smoothed value; determination means (for example, an area determination section 13 of FIG. 1) for determining an area to which the pixel belongs on the basis of the smoothed value and for outputting area information indicating the area; parameter determination means (for example, a threshold-value determination section 14 of FIG. 1) for determining a parameter for a noise removal process for each of the pixels constituting the image data on the basis of the area information and the smoothed value; and noise removal means (for example, a non-linear smoothing filter 15 of FIG. 1) for performing the noise removal process on the image data on the basis of the parameter determined for each of the pixels.

Figure 4:
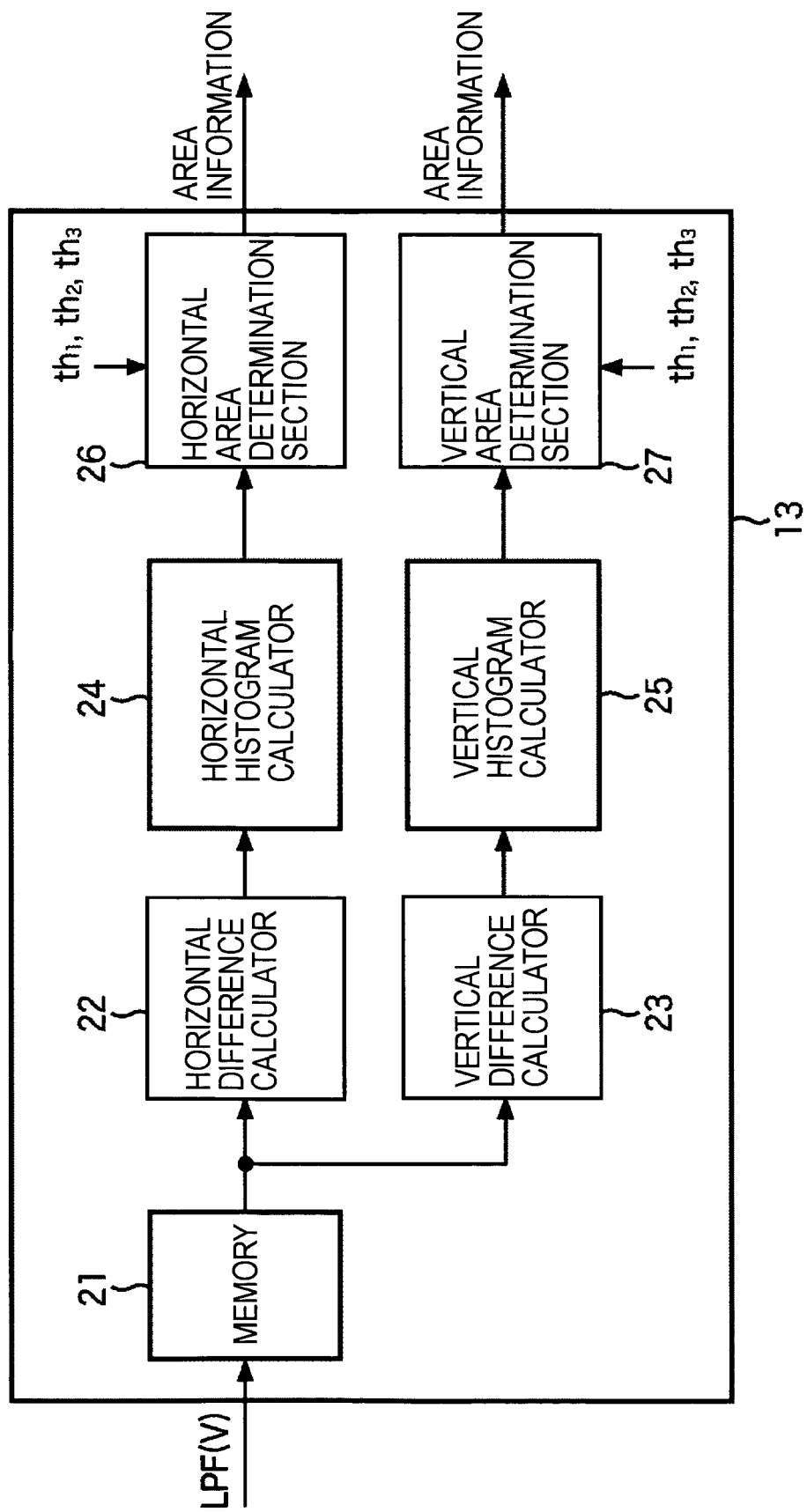
FIG. 4 is a block diagram showing an example of the configuration of an area determination section 13.

In the data processing apparatus according to the embodiment of the present invention, the determination means includes: amount of change calculation means (for example, a horizontal difference calculator 22 and a vertical difference calculator 23 of FIG. 4) for calculating the amount of changes in the smoothed value of pixels including a pixel of interest and those positioned in the vicinity of the pixel of interest among the pixels constituting the image data; and histogram calculation means (for example, a horizontal histogram calculator 24 and a vertical histogram calculator 25 of FIG. 4) for calculating a histogram of the amount of changes; and area determination means (for example, a horizontal area determination section 26 and a vertical area determination section 27 of FIG. 4) for determining an area to which the pixel belongs on the basis of the histogram.

The data processing method according to an embodiment of the present invention includes the steps of:

calculating (for example, step S11 of FIG. 11) variance information indicating the degree of variance of pixel values for each of a plurality of pixels constituting the image data; smoothing (for example, step S12 of FIG. 11) the variance information and outputting a smoothed value; determining (for example, step S13 of FIG. 11) an area to which the pixel belongs on the basis of the smoothed value and outputting area information indicating the area; determining (for example, step S14 of FIG. 11) a parameter for a noise removal process for each of the pixels constituting the image data on the basis of the area information and the smoothed value; and performing (for example, step S15 of FIG. 11) the noise removal process on the image data on the basis of the parameter determined for each of the pixels.

The correspondence between the constituent features of the program according to an embodiment of the present invention and the specific examples in the embodiments of the present invention are identical to that of the above-described data processing method of the present invention, and accordingly, the description thereof is omitted herein.

Specific embodiments to which the present invention is applied will be described in detail below with reference to the drawings.

FIG. 1 is a block diagram showing an example of the configuration of an embodiment of a noise removal apparatus to which the present invention is applied.

In FIG. 1, a noise removal apparatus 10 includes a variance calculator 11, a low-pass filter 12, an area determination section 13, a threshold-value determination section 14, and a non-linear smoothing filter 15.

The variance calculator 11 and the non-linear smoothing filter 15 are connected to a terminal (not shown) for inputting image data serving as input data to the noise removal apparatus 10, and the variance calculator 11 is also connected to the low-pass filter 12. Furthermore, the low-pass filter 12 is connected to the area determination section 13 and the threshold-value determination section 14. The area determination section 13 is connected to the threshold-value determination section 14, and the threshold-value determination section 14 is connected to the non-linear smoothing filter 15. The non-linear smoothing filter 15 is connected to a terminal (not shown) for outputting image data serving as output data from the noise removal apparatus 10.

The image data serving as input data is input, for example, in units of one frame (field), to the variance calculator 11. The image data is such that, for example, image data encoded by the MPEG system is decoded. The variance calculator 11 calculates variance information indicating the degree of variance of pixel values, for example, a variance V, for each pixel constituting image data for one frame, and supplies the calculated variance to the low-pass filter 12.

The low-pass filter 12 smoothes the variance V from the variance calculator 11. The low-pass filter 12 supplies a smoothed value LPF (V) obtained by smoothing the variance V to the area determination section 13 and the threshold-value determination section 1.

On the basis of the smoothed value LPF (V) output from the low-pass filter 12, the area determination section 13 performs an area determination process for, with respect to each pixel constituting image data, making a determination as to which one of an edge area, which is an area forming an edge of an image in which the pixel values change sharply or an area in the vicinity of an edge, a texture area, which is an area in which changes in the pixel values of a pattern on the surface of an object, etc., exist to a certain degree, a flat area in which changes in the pixel values negligibly exist, and another area, the pixel belongs.

The area determination section 13 supplies the area information obtained as a result of performing the area determination process to the threshold-value determination section 14. The area information is information indicating which one of the edge area, the texture area, the flat area, and the other area the area to which the pixel of interest among the pixels constituting the image data belongs is.

On the basis of the smoothed value LPF (V) from the low-pass filter 12 and the area information from the area determination section 13, the threshold-value determination section 14 determines a threshold value ϵ, which is a parameter for the noise removal process performed by the non-linear smoothing filter 15, and supplies the determined threshold value ϵ to the non-linear smoothing filter 15. The threshold value ϵ is determined in such a manner as to correspond to each of the edge area, the texture area, the flat area, and the other area.

On the basis of the threshold value ϵ from the threshold-value determination section 14, the non-linear smoothing filter 15 performs a noise removal process on the image data serving as input data. That is, the non-linear smoothing filter 15 performs filtering of the image data so that the image data is smoothed at the degree based on the threshold value ϵ from the threshold-value determination section 14. For example, if the threshold value ϵ is a large value, the non-linear smoothing filter 15 filters the image data at a high smoothing degree, and if the threshold value ϵ is a small value, the non-linear smoothing filter 15 filters the image data at a low-smoothing degree.

As described above, the threshold value ϵ is determined in such a manner as to correspond to each of the edge area, the texture area, the flat area, and the other area. Therefore, the non-linear smoothing filter 15 filters the image data at a degree of smoothing corresponding to each of the edge area, the texture area, the flat area, and the other area.

As a result of performing the above-described filtering as a noise removal process, the non-linear smoothing filter 15 removes mosquito noise from the image data serving as input data, and outputs image data serving as output data.

Next, a description will be given, with reference to FIG. 2, calculation of the variance V by the variance calculator 11 of FIG. 1.

The variance calculator 11 sequentially selects pixels constituting the image data, for example, in the order of raster scanning, and determines variance information indicating the degree of variance of the pixel values, for example, a variance, with respect to the pixel of interest.

Figure 2:
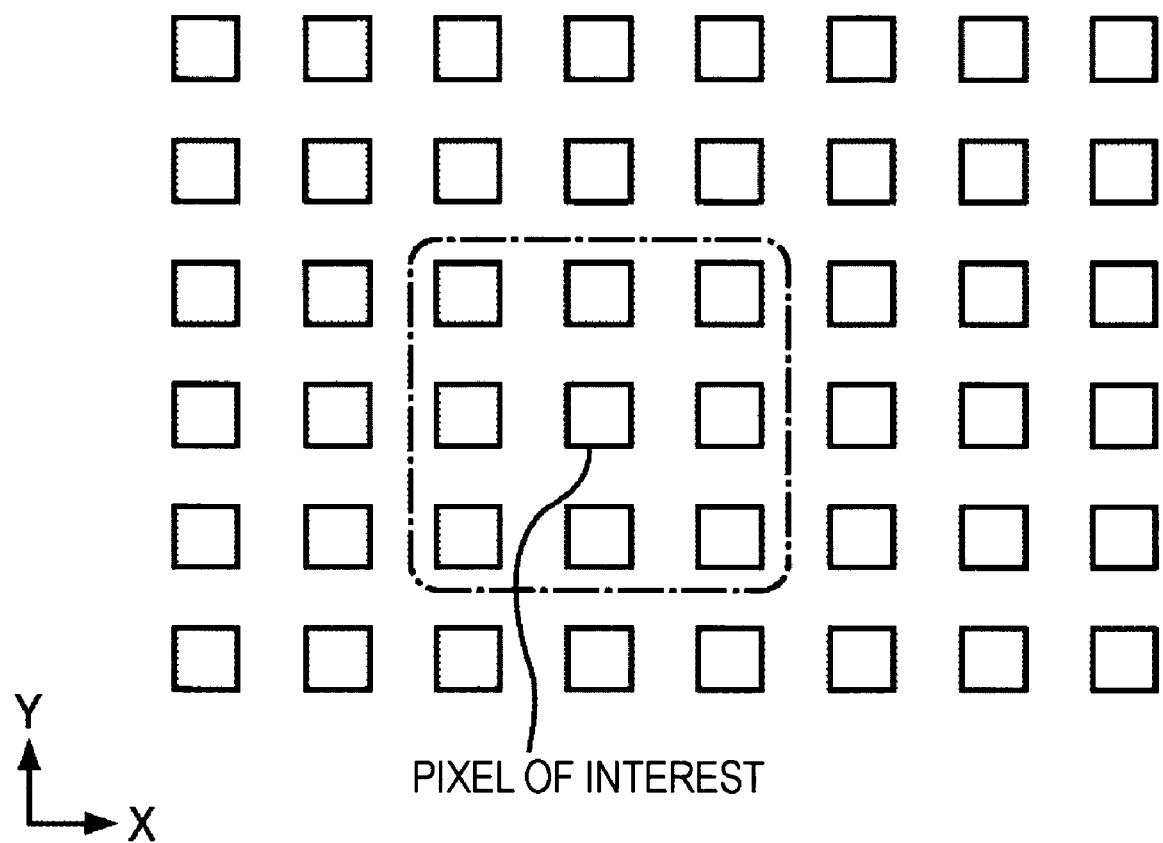
FIG. 2 illustrates calculation of a variance V by a variance calculator 11.

That is, for example, as shown in FIG. 2, the variance calculator 11 determines the variance of the pixel values of 3×3 pixels disposed in the length and breadth in which the pixel of interest is at the center, as the variance for the pixel of interest in accordance with equation (1):

$$V = \frac{1}{N}\sum_{i=1}^{N}(pi - ave)^2 \quad (1)$$

In equation (1), V represents a variance for the pixel of interest. N represents the number of pixels (pixel values) used to determine the variance V for the pixel of interest, which is 9 in the embodiment of FIG. 2. $p_i$ represents the pixel value of the i-th pixel among the N pixels used to determine the variance V for the pixel of interest, and ave represents an average value $(p_1+p_2+ \ldots +p_N)/N$ of the pixel values of the N pixels.

The variance calculator 11 sequentially changes the pixel of interest in the order of raster scanning and sequentially calculates the variance V, thus determining the variance V for all the pixels constituting the image data.

In addition to the variance V determined in accordance with equation (1), as the variance information, for example, a value determined in accordance with equation (2) and another value indicating the degree of variance of the pixel values can be employed:

$$V = \frac{1}{N}\sum_{i=1}^{N}|pi - ave| \quad (2)$$

Figure 3:
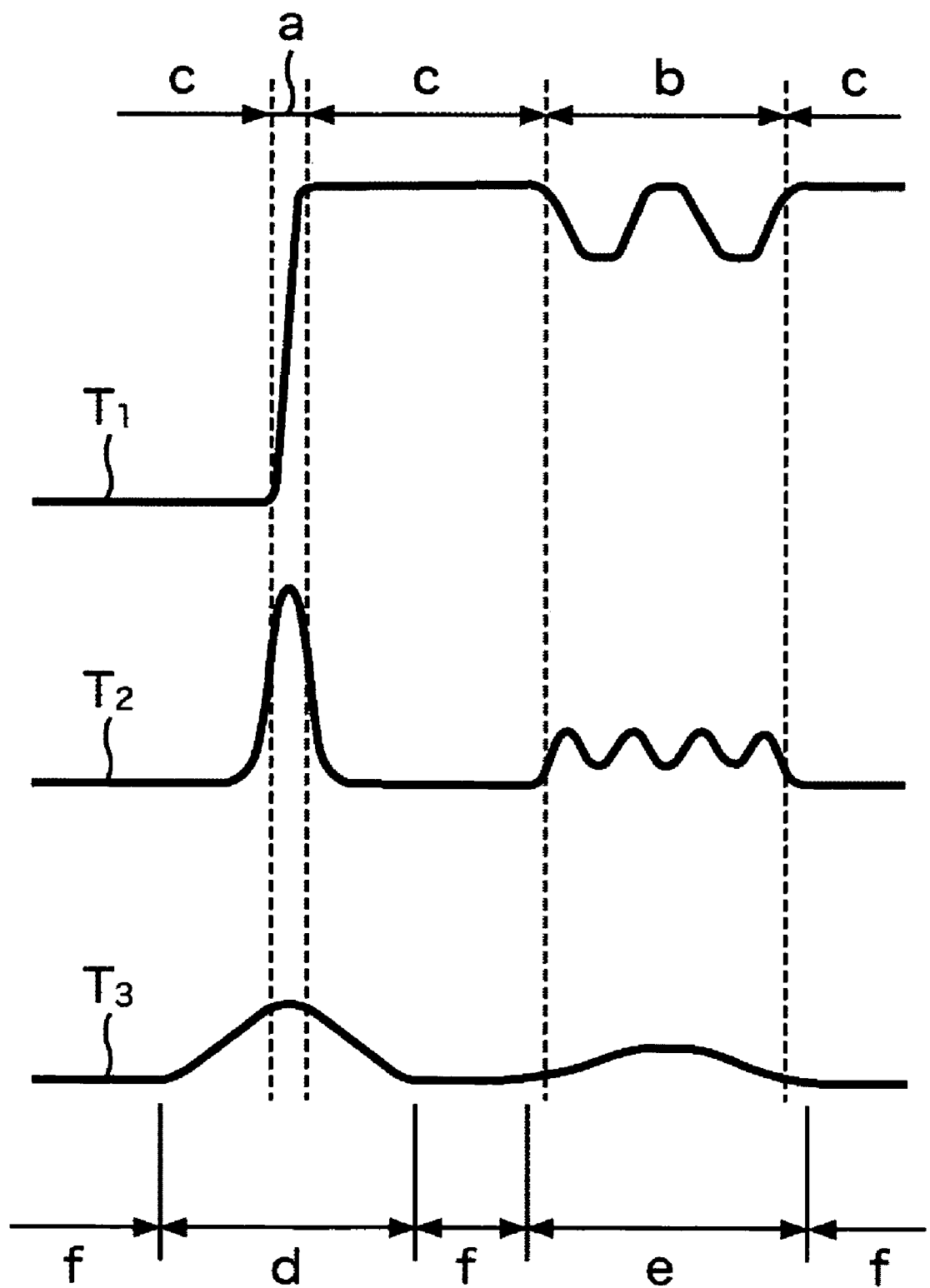
FIG. 3 is a schematic view showing waveforms of image data, a variance V, and a smoothed value LPF (V)

FIG. 3 is a schematic view showing waveforms of image data (image data to be filtered by the non-linear smoothing filter 15) input to the variance calculator 11 of FIG. 1, a variance V obtained by the variance calculator 11, and a smoothed value LPF (V) obtained by the low-pass filter 12.

In FIG. 3, a waveform $T_1$ indicates a waveform of the pixel value of a certain horizontal (vertical) line in the image data serving as input data input to the variance calculator 11. In the waveform $T_1$, a range "a" of an edge in which changes in pixel values are sharp, a range "b" of an edge in which changes in the pixel values exist to some degree, and a range "c" of an edge in which a changes in the pixel values negligibly exists.

A waveform $T_2$ is a waveform of the variance V determined by the variance calculator 11 by targeting the waveform $T_1$ (image data). The larger the degree of variance (degree of change) of the waveform $T_1$, the greater the value of the variance V, and the smaller the degree of variance of the waveform $T_1$, the smaller the value of the variance V. Therefore, as shown in FIG. 3, in the range "a" and in the vicinity thereof, the waveform $T_2$ becomes a sharp convex shape as a result of being affected by the changes in the pixel values corresponding to the edge of the waveform $T_1$, and in the range "b" and in the vicinity thereof, the waveform $T_2$ becomes of a shape that changes to a certain degree as a result of being affected by the changes in the pixel values corresponding to the texture of the waveform $T_1$.

A waveform $T_3$ is a waveform of a smoothed value LPF (V) obtained by smoothing of the waveform $T_2$ (variance V) by the low-pass filter 12. As shown in FIG. 3, the shape of the waveform. $T_3$ has been smoothed compared with that of the waveform $T_2$. That is, in a range "d" wider to some degree than the range "a", the waveform $T_3$ becomes a convex shape having a slope of a certain magnitude. In a range "e" slightly wider than the range "b", the waveform $T_3$ becomes a convex shape having a slope smaller than the slope in the range "d". In a range "f" other than the ranges d and e, the waveform $T_3$ becomes flat without a slope.

FIG. 4 is a block diagram showing an example of the configuration of the area determination section 13 of FIG. 1.

In FIG. 4, the area determination section 13 includes a memory 21, a horizontal difference calculator 22, a vertical difference calculator 23, a horizontal histogram calculator 24, a vertical histogram calculator 25, a horizontal area determination section 26, and a vertical area determination section 27.

The smoothed values LPF (V) are supplied to the memory 21 from the low-pass filter 12 of FIG. 1. The memory 21 stores the smoothed values LPF (V) of the pixels including the pixel of interest and those positioned in the vicinity of the pixel of interest among the smoothed values LPF (V) output from the low-pass filter 12.

That is, the smoothed values LPF (V) are supplied to the area determination section 13 from the low-pass filter 12. In the area determination section 13, the pixels constituting the image data are sequentially selected as the pixel of interest in the order of raster scanning. The memory 21 stores the smoothed values LPF (V) of the pixels including the pixel of interest and those positioned in the vicinity of the pixel of interest among the smoothed values LPF (V) supplied from the low-pass filter 12.

The horizontal difference calculator 22 calculates, with respect to the pixel of interest, the amount of horizontal changes of the smoothed values LPF (V) stored in the memory 21, and supplies the calculated changes to the horizontal histogram calculator 24.

The vertical difference calculator 23 calculates, with respect to the pixel of interest, the amount of vertical changes of the smoothed values LPF (V) stored in the memory 21, and supplies the calculated changes to the vertical histogram calculator 25.

The horizontal histogram calculator 24 calculates (creates) a histogram of the amount of horizontal changes of the pixel of interest, which is supplied from the horizontal difference calculator 22. That is, the horizontal histogram calculator 24 determines a histogram composed of the numbers of occurrences hist(1), hist(2), and hist(3) of the respective amounts of change of the values in the first, second, and third ranges by targeting the amount of horizontal changes with respect to the pixel of interest, which is supplied from the horizontal difference calculator 22. The horizontal histogram calculator 24 supplies the histogram composed of the numbers of occurrences hist(1), hist(2), and hist(3), which are determined for each pixel of interest, to the horizontal area determination section 26.

Similarly to the horizontal histogram calculator 24, the vertical histogram calculator 25 determines a histogram composed of the numbers of occurrences hist(1), hist(2), and hist(3) by targeting the amount of change in the vertical direction with respect to the pixel of interest, which is supplied from the vertical difference calculator 23, and supplies the histogram to the vertical area determination section 27.

In the horizontal area determination section 26, the threshold values th1, th2, and th3 for determining an area to which the pixel of interest belongs are supplied in advance. The horizontal area determination section 26 determines the area to which the pixel of interest belongs on the basis of the numbers of occurrences hist(1), hist(2), and hist(3) of the histogram with respect to the pixel of interest from the horizontal histogram calculator 24 and on the basis of the threshold values th1, th2, and th3. That is, the horizontal area determination section 26 makes a determination as to which one of the edge area, the texture area, the flat area, and the other area the pixel of interest belongs, and outputs the determination result, that is, information indicating the area to which the pixel of interest belongs.

Similarly to the horizontal area determination section 26, the vertical area determination section 27 determines the area to which the pixel of interest belongs on the basis of the numbers of occurrences hist(1), hist(2), and hist(3) of the histogram with respect to the pixel of interest from the vertical histogram calculator 25, and outputs area information as the determination result.

Figure 5:
FIG. 5 shows the stored content of a memory 21.

FIG. 5 shows the stored content of the memory 21 of FIG. 4. A description will now be given, with reference to FIG. 5, of calculation of the amount of change in pixel values by the horizontal difference calculator 22 and the vertical difference calculator 23 of FIG. 4.

FIG. 5 shows smoothed values C[i](j) of pixels stored by the memory 21. The memory 21 stores, for example, (the smoothed values) C[i](j) of a total of 35 pixels, namely 7×5 pixels in the breadth and length with (the smoothed value) C[3](0) of the pixel of interest being in the center among the pixels constituting the image data. That is, the memory 21 stores the smoothed values C[i](j) of the pixels, which are positioned in five rows (i=1 to 5) in the vertical direction and in seven columns (j=−3 to 3) in the horizontal direction with the pixel of interest C[3](0) being in the center, that is, the smoothed value C[1](−3) to the smoothed value C[5](3).

Hereinafter, as described above, the area of 7×5 pixels with the pixel of interest being in the center, in which the smoothed values are stored in the memory 21 with respect to the pixel of interest, will be referred to as an "area of interest".

The horizontal difference calculator 22 calculates, for example, a difference value (absolute difference value) diff[i](j) of equation (3) below as the amount of change in the horizontal direction of the pixels of the area of interest.

$$diff[i](j)=|C[i](j)-C[i](0)|, (i=1 \text{ to } 5, j=-3 \text{ to } 3) \qquad (3)$$

The horizontal difference calculator 22 outputs 30 horizontal difference values diff[i](j) by calculating equation (3). More specifically, with respect to the first row (i=1), the horizontal difference calculator 22 calculates the difference value between the smoothed value C[1](0) and each of the smoothed value C[1](−3), the smoothed value C[1](−2), the smoothed value C[1](−1), the smoothed value C[1](1), the smoothed value C[1](2), and the smoothed value C[1](3), and outputs six of the difference values diff[1](−3), the difference value diff[1](−2), the difference value diff[1](−1), the difference value diff[1](1), the difference value diff[1](2), and the difference value diff[1](3) in the horizontal direction.

Similarly, also with respect to the second row (i=2), the horizontal difference calculator 22 calculates the difference value between the smoothed value C[2](0) and each of the smoothed value C[2](−3), the smoothed value C[2](−2), the smoothed value C[2](−1), the smoothed value C[2](1), the smoothed value C[2](2), and the smoothed value C[2](3), and outputs six of the difference values diff[2](−3), the difference value diff[2](−2), the difference value diff[2](−1), the difference value diff[2](1), the difference value diff[2](2), and the horizontal difference value diff[2](3). Similarly, hereinafter, the horizontal difference calculator 22 outputs six horizontal difference values with respect to third row to the fifth row (i=3 to 5). Therefore, the horizontal difference calculator 22 outputs 30 horizontal difference values diff[i](j) with respect to the first row to the fifth row.

The vertical difference calculator 23 calculates, for example, the difference value (absolute difference value) diff[i](j) of equation (4) as the amount of change in the vertical direction of the pixels of the area of interest.

$$diff[i](j)=|C[i](j)-C[3](j)|, (i=1 \text{ to } 5, j=-3 \text{ to } 3) \quad (4)$$

By calculating equation (4), the vertical difference calculator 23 outputs 28 vertical difference values diff[i](j). Similarly to the case in which a description is given of the horizontal difference calculator 22, the vertical difference calculator 23 outputs four vertical difference values diff[i](j) for each column, and outputs 28 vertical difference values diff[i](j) for the first to seventh columns.

In FIG. 5, an example in which the area of interest stored in the memory 21 has 5×7 pixels is shown. However, the area of interest stored in the memory 21 is not limited to 5×7 pixels. The size of the area of interest, in particular, the size of the length, can be determined, for example, on the basis of the block size for a DCT process performed when the image data to be filtered by the non-linear smoothing filter 15 is compressed.

Next, a description will be given, with reference to FIG. 6, of a histogram of the amount of change determined by the horizontal histogram calculator 24 and the vertical histogram calculator 25 of FIG. 4.

Figures 6, 7:
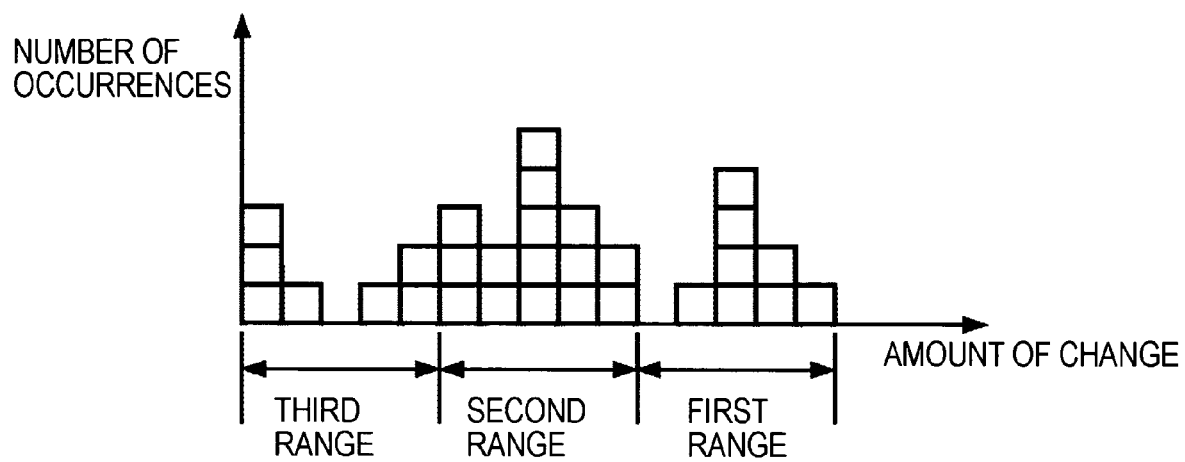
FIG. 6 illustrates a histogram of the amount of changes determined by a horizontal histogram calculator 24.
FIG. 7 illustrates a process for determining an area to which a pixel of interest belongs, which is performed by a horizontal area determination section 26 and a vertical area determination section 27.

FIG. 6 shows a histogram in which the amount of change is plotted in the horizontal axis and the number of occurrences is plotted in the vertical axis. In the histogram of FIG. 6, the value of the amount of change increases from the left in the horizontal axis toward the right. The horizontal axis is divided into three ranges, that is, a first range, a second range, and a third range in sequence starting from the range in which the value of the amount of change is large.

As described with reference to FIG. 5, 30 (difference values) as the amount of change in the horizontal direction are supplied to the horizontal histogram calculator 24 from the horizontal difference calculator 22, and the horizontal histogram calculator 24 calculates the histogram of the amount of change in the horizontal direction. That is, on the basis of 30 of the amounts of change in the horizontal direction from the horizontal difference calculator 22, the horizontal histogram calculator 24 determines each of the number of occurrences hist(1) of the amount of change of the first range, the number of occurrences hist(2) of the amount of change of the second range, and the number of occurrences hist(3) of the amount of change of the third range, and obtains a histogram in the horizontal direction of three divisions made up of the three numbers of occurrences hist(1), hist(2), and hist(3).

In FIG. 6, the first to third ranges in the horizontal axis are at the same size, but may be at different sizes. The first to third ranges can be determined, for example, by performing simulation by using a lot of image data. Furthermore, the first to third ranges can be changed, for example, in response to operation by a user.

Similarly to the horizontal histogram calculator 24, on the basis of 28 of the amounts of change in the vertical direction, which are supplied from the vertical difference calculator 23, the vertical histogram calculator 25 determines each of the number of occurrences hist(1) of the amount of change of the first range, the number of occurrences hist(2) of the amount of change of the second range, and the number of occurrences hist(3) of the amount of change of the third range, and obtains a histogram in the vertical direction of three divisions made up of the three numbers of occurrences hist(1), hist(2), and hist(3).

Next, a description will be given, with reference to FIG. 7, of an area determination process for determining an area to which the pixel of interest belongs, which is performed by the horizontal area determination section 26 and the vertical area determination section 27 of FIG. 4.

As described above, the threshold values th1, th2, and th3 for determining an area are supplied in advance to the horizontal area determination section 26, and the numbers of occurrences hist(1), hist(2), and hist(3) of the histogram in the vertical direction with respect to the pixel of interest are supplied thereto from the horizontal histogram calculator 24.

The horizontal area determination section 26 compares the number of occurrences hist(1) with the threshold value th1, and as necessary, compares the number of occurrences hist(2) with the threshold value th2 and compares the number of occurrences hist(3) with the threshold value th3, so that, on the basis of these comparison results, a determination is made as to which one of the edge area, the texture area, the flat area, and another area the pixel of interest belongs.

That is, for example, as shown in FIG. 7, if "hist(1)>th1" is true (1), the horizontal area determination section 26 determines that the area to which the pixel of interest belongs is an edge area. If "hist(1)>th1" is false (0) and if "hist(2)>th2" is true (1), the horizontal area determination section 26 determines that the area to which the pixel of interest belongs is a texture area.

If "hist(1)>th1" and "hist(2)>th2" are false (0) and if "hist(3)>th3" is true (1), the horizontal area determination section 26 determines that the area to which the pixel of interest belongs is a flat area. Furthermore, if all of "hist(1)>th1", "hist(2)>th2", and "hist(3)>th3" are false (else), the horizontal area determination section 26 determines that the area to which the pixel of interest belongs is not the edge area, the texture area, or the flat area (or not known as to which one of them) and is another area.

If "hist(1)>th1" is true (1), it is determined that the area to which the pixel of interest belongs is an edge area regardless of whether "hist(2)>th2" and "hist(3)>th3" are true or false. As a consequence, in the square that comprises the row of the edge area of the table in FIG. 7 and the column of "hist(2)>th2" or "hist(3)>th3", "x" (don't care) is written. Similarly, if "hist(1)>th1" is false (0) and if "hist(2)>th2" is true (1), it is determined that the area to which the pixel of interest belongs is a texture area regardless of whether "hist(3)>th3" is true or false. As a consequence, in the square that comprises the row of the texture area of the table in FIG. 7 and the column of "hist(3)>th3", "x" is written.

Similarly to the horizontal area determination section 26, the threshold values th1, th2, and th3 for determining an area are given in advance to the vertical area determination section 27. On the basis of the numbers of occurrences hist(1), hist(2), and hist(3) of the histogram in the vertical direction with respect to the pixel of interest, which are output from the vertical histogram calculator 25, the vertical area determination section 27 makes a determination as to which one of the edge area, the texture area, the flat area, and the other area the pixel of interest belongs.

As described above, in the horizontal area determination section 26, a determination is made as to the area to which the pixel of interest belongs when the image data is viewed as it were along the horizontal direction, and in the vertical area determination section 27, a determination is made as to the area to which the pixel of interest belongs when the image data is viewed as it were along the vertical direction.

In the horizontal area determination section 26 and the vertical area determination section 27, the threshold values th1, th2, and th3 for determining an area may be the same value or may be different values.

A description will now be given, with reference to FIG. 3 above, of the relationship between the smoothed value LPF (V) input to the area determination section 13 of FIG. 4 and the determination of the area to which the pixel of interest belongs (type of area) by the horizontal area determination section 26.

As described above, the waveform $T_3$ of FIG. 3 is a waveform of the smoothed value LPF (V) obtained by the low-pass filter 12, and the portion of the range in which the pixel of interest is at the center within the waveform $T_3$ is stored as the area of interest in the memory 21. The horizontal difference calculator 22 calculates the amount of change by targeting the range stored as the area of interest in the memory 21 within the waveform $T_3$, and the horizontal histogram calculator 24 obtains a histogram of the amount of change.

The waveform $T_3$ has a slope of a certain degree of magnitude in the range "d". Therefore, in the histogram of the amount of change in which the range that partially or entirely overlaps the range "d" is calculated as the area of interest, the number of occurrences hist(1) of a large amount of change becomes a large value.

In the range "e", the waveform $T_3$ has a slope smaller than the slope in the range "d". Therefore, in the histogram of the amount of change in which the range that partially or entirely overlaps the range "e" is calculated as the area of interest, the number of occurrences hist(1) becomes a small value, and the number of occurrences hist(2) of a medium degree of the amount of change becomes a large value.

The waveform $T_3$ has no slope in the range "f". Therefore, in the histogram of the amount of change in which the range "c" containing only the range "f" is calculated as the area of interest, the number of occurrences hist(1) and the number of occurrences hist(2) become small values, and the number of occurrences hist(3) of a small amount of change becomes a large value.

On the basis of the above-described properties (characteristics) of the amount of change, the horizontal area determination section 26 makes a determination as to the area to which the pixel of interest belongs, as shown in the table of FIG. 7. Therefore, in the horizontal area determination section 26, the area to which the pixels in a range slightly wider than the range "d" around the edge, containing the range "a" of edges, belongs is determined as an edge area; the area to which the pixels in a range slightly wider than the range "e", containing the range "b" of texture, belongs is determined as a texture area; and the area to which the pixels in a range "f" narrower than the flat range "c" belongs is determined as a flat area.

Figure 8:
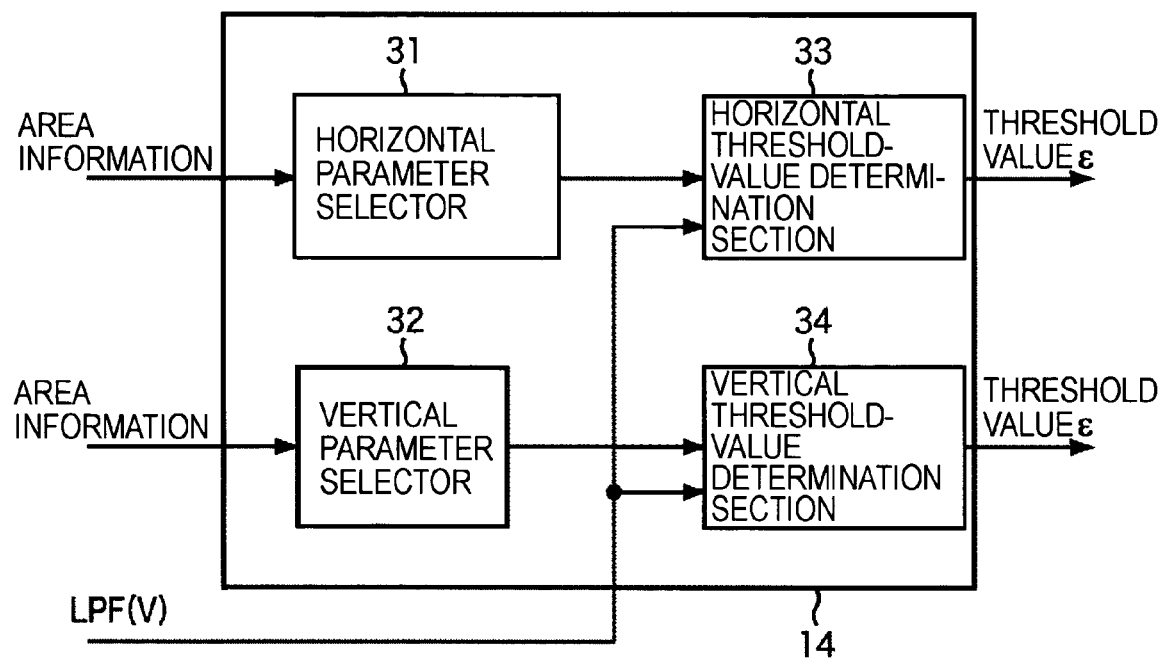
FIG. 8 is a block diagram showing an example of the configuration of a threshold-value determination section 14.

FIG. 8 is a block diagram showing an example of the configuration of the threshold-value determination section 14.

In FIG. 8, the threshold-value determination section 14 includes a horizontal direction parameter selector 31, a vertical direction parameter selector 32, a horizontal threshold-value determination section 33, and a vertical threshold-value determination section 34.

Area information in the horizontal direction with respect to the pixel of interest (information indicating which one of the edge area, the texture area, the flat area, and the other area the pixel of interest belongs) is supplied from the horizontal area determination section 26 of FIG. 4 to the horizontal direction parameter selector 31. On the basis of the area information in the horizontal direction, the horizontal direction parameter selector 31 selects (determines) a parameter for the pixel of interest in the horizontal direction, which is used for the horizontal threshold-value determination section 33 to determine the threshold value $\epsilon$, and supplies it to the horizontal threshold-value determination section 33.

On the basis of the area information in the vertical direction with respect to the pixel of interest, which is supplied from the vertical area determination section 27 of FIG. 4, the vertical direction parameter selector 32 selects a parameter for the pixel of interest in the vertical direction, which is used for the vertical threshold-value determination section 34 to determine the threshold value $\epsilon$, and supplies it to the vertical threshold-value determination section 34.

A determining parameter in the horizontal direction is supplied to the horizontal threshold-value determination section 33 from the horizontal direction parameter selector 31, and the smoothed value LPF (V) is supplied thereto from the low-pass filter 12 of FIG. 1. On the basis of the parameter for determining the pixel of interest in the horizontal direction from the horizontal direction parameter selector 31 and on the basis of the smoothed value LPF (V) with respect to the pixel of interest from the low-pass filter 12, the horizontal threshold-value determination section 33 determines the horizontal threshold value $\epsilon$ with respect to the pixel of interest and outputs it.

On the basis of the parameter for determining the pixel of interest in the vertical direction from the vertical direction parameter selector 32 and on the basis of the smoothed value LPF (V) with respect to the pixel of interest from the low-pass filter 12, the vertical threshold-value determination section 34 determines the threshold value $\epsilon$ in the vertical direction with respect to the pixel of interest and outputs the determined threshold value $\epsilon$.

Next, a description will be given, with reference to FIG. 9, of a parameter for determining the pixel of interest in the horizontal direction, which is supplied from the horizontal direction parameter selector 31 of FIG. 8 to the horizontal threshold-value determination section 33, and of the determination of the horizontal threshold value $\epsilon$ by the horizontal threshold-value determination section 33.

Figure 9:
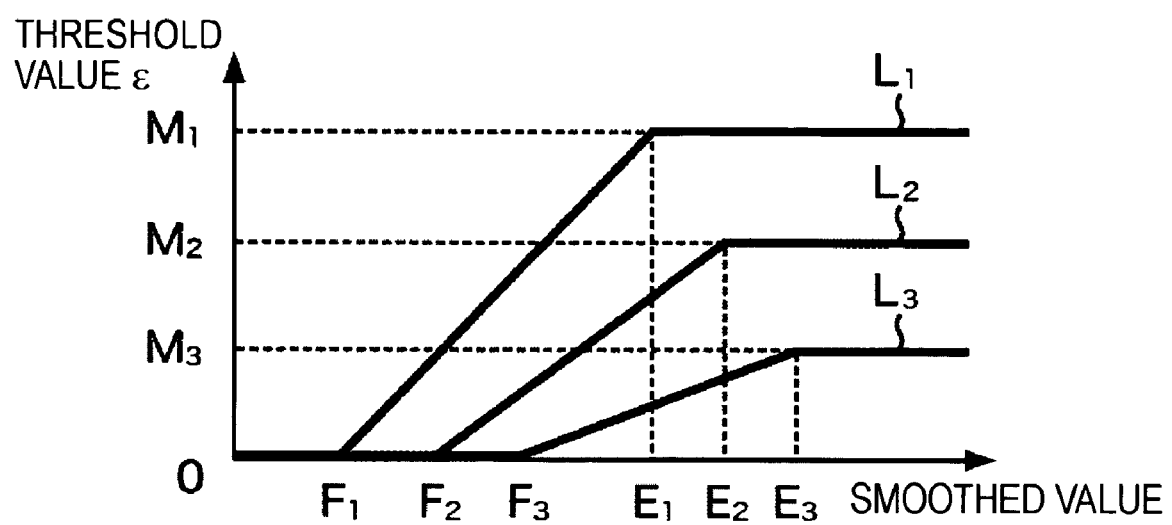
FIG. 9 shows a threshold-value determination curve.

FIG. 9 shows a threshold-value determination curve that shows the relationship between a smoothed value LPF (V) and a threshold value $\epsilon$. In FIG. 9, the horizontal axis indicates the smoothed value LPF (V), and the vertical axis indicates the threshold value $\epsilon$. The value of the smoothed value LPF (V) increases from the left in the horizontal axis toward the right, and the value of the threshold value $\epsilon$ increases from the bottom of the vertical axis toward the upward direction.

On the basis of the parameter for determining the pixel of interest, which is supplied from the horizontal direction parameter selector 31, the horizontal threshold-value determination section 33 determines one of threshold-value determination curves $L_1$, $L_2$, and $L_3$ shown in FIG. 9 as a threshold-value determination curve used to determine the threshold value $\epsilon$. On the basis of the threshold-value determination curve and the smoothed value LPF (V) of the pixel of interest from the low-pass filter 12 of FIG. 1, the horizontal threshold-value determination section 33 determines the threshold value $\epsilon$ serving as a parameter for filtering the pixel of interest.

Here, the threshold-value determination curve showing the relationship between the smoothed value LPF (V) and the threshold value $\epsilon$ is, for example, a curve specified by variables (parameters) E, F, and M. That is, for example, as shown in FIG. 9, the threshold-value determination curve is a curve in which, when the smoothed value LPF (V) is smaller than or equal to F, the threshold value $\epsilon$ is maintained constant at 0. When the smoothed value LPF (V) is greater than F and smaller than E, the threshold value $\epsilon$ increases in proportion to the smoothed value LPF (V). When the smoothed value LPF (V) is greater than or equal to E, the threshold value $\epsilon$ is maintained constant at M (>0).

For example, the variables E, F, and M for specifying the threshold-value determination curve are supplied as determining parameters from the horizontal direction parameter selector 31 to the horizontal threshold-value determination section 33. Furthermore, for example, in place of the variable F, a slope k in which the threshold value $\epsilon$ increases in proportion to the smoothed value LPF (V) may be used as a determining parameter.

FIG. 9 shows a threshold-value determination curve $L_1$ in which the determining parameters E, F, and M are determining parameters $E_1$, $F_1$, and $M_1$, respectively, a threshold-value determination curve $L_2$ in which the determining parameters E, F, and M are determining parameters $E_2$, $F_2$, and $M_2$, respectively, and a threshold-value determination curve $L_3$ in which the determining parameters E, F, and M are determining parameters $E_3$, $F_3$, and $M_3$, respectively.

The horizontal direction parameter selector 31 stores, for example, (the value of) the determining parameter and the area information in such a manner as to correspond to each other, and selects a determining parameter that corresponds to the area information in the horizontal direction, which is supplied from the horizontal area determination section 26 of FIG. 4.

For example, the horizontal direction parameter selector 31 stores the area information indicating the edge area and the determining parameters $E_1$, $F_1$, and $M_1$ in such a manner as to correspond to each other. When the area information from the horizontal area determination section 26 indicates an edge area, the horizontal direction parameter selector 31 selects the determining parameters $E_1$, $F_1$, and $M_1$. Furthermore, the horizontal direction parameter selector 31 stores the area information indicating a texture area and the determining parameters $E_2$, $F_2$, and $M_2$ in such a manner as to correspond to each other. When the area information from the horizontal area determination section 26 indicates a texture area, the horizontal direction parameter selector 31 selects the determining parameters $E_2$, $F_2$, and $M_2$.

Furthermore, the horizontal direction parameter selector 31 stores the area information indicating a flat area and the determining parameters $E_3$, $F_3$, and $M_3$ in such a manner as to correspond to each other. When the area information from the horizontal area determination section 26 indicates a flat area, the horizontal direction parameter selector 31 selects the determining parameters $E_3$, $F_3$, and $M_3$. Furthermore, the horizontal direction parameter selector 31 stores the area information indicating the other area in such a manner as to correspond to, for example, the determining parameters $E_3$, $F_3$, and $M_3$. When the area information from the horizontal area determination section 26 indicates the other area, also, the horizontal direction parameter selector 31 selects the determining parameters $E_3$, $F_3$, and $M_3$.

Here, in FIG. 9, the determining parameter E for the threshold-value determination curves $L_1$, $L_2$, and $L_3$ is larger in the order of $E_1$, $E_2$, and $E_3$; the determining parameter F for the threshold-value determination curves $L_1$, $L_2$, and $L_3$ is larger in the order of $F_1$, $F_2$, and $F_3$; and the determining parameter M for the threshold-value determination curves $L_1$, $L_2$, and $L_3$ is larger in the order of $M_1$, $M_2$, and $M_3$.

Therefore, when the area to which the pixel of interest belongs is an edge area, the threshold value $\epsilon$ is determined to be 0 in accordance with the threshold-value determination curve $L_1$ if the smoothed value LPF (V) of the pixel of interest is smaller than or equal to the small value $F_1$. Furthermore, if the smoothed value LPF (V) of the pixel of interest is a value in a range of the small value $F_1$ to the small value $E_1$, the threshold value $\epsilon$ is determined to be a large value in proportion to the smoothed value LPF (V). If the smoothed value LPF (V) of the pixel of interest is greater than or equal to the small value $E_1$, the threshold value $\epsilon$ is determined to be a large value $M_1$.

When the area to which the pixel of interest belongs is a texture area, the threshold value $\epsilon$ is determined to be 0 in accordance with the threshold-value determination curve $L_2$ if the smoothed value LPF (V) of the pixel of interest is smaller than or equal to a medium value $F_2$ greater than the small value $F_1$. Furthermore, if the smoothed value LPF (V) of the pixel of interest is a value in a range in which it is greater than or equal to the medium value $F_2$ greater than the small value $F_1$ and is smaller than or equal to the medium value $F_2$ greater than the small value $E_1$, the threshold value $\epsilon$ is determined to be a medium value in proportion to the smoothed value LPF (V). If the smoothed value LPF (V) of the pixel of interest is greater than or equal to a medium value $E_2$, the threshold value $\epsilon$ is determined to be the medium value $M_2$ smaller than the large value $M_1$.

When the area to which the pixel of interest belongs is a flat area or another area, the threshold value $\epsilon$ is determined to be 0 in accordance with the threshold-value determination curve $L_3$ if the smoothed value LPF (V) of the pixel of interest is smaller than or equal to a large value $F_3$ greater than the medium value $F_2$. Furthermore, when the smoothed value LPF (V) of the pixel of interest is a value in a range in which it is greater than or equal to the large value $F_3$ greater than the medium value $F_2$ and is smaller than or equal to the large value $E_3$ greater than the medium value $E_2$, the threshold value $\epsilon$ is determined to be a small value in proportion to the smoothed value LPF (V). When the smoothed value LPF (V) of the pixel of interest is greater than or equal to the large value $E_3$, the threshold value $\epsilon$ is determined to be a small value $M_3$ smaller than the medium value $M_2$.

In the manner described above, on the basis of the area information indicating which one of the edge area, the texture area, the flat area, and the other area the pixel of interest belongs and on the basis of the smoothed value LPF (V) of the pixel of interest, the horizontal threshold-value determination section 33 determines a horizontal threshold value $\epsilon$ (parameter for filtering in the horizontal direction as a noise removal process) with respect to the pixel of interest.

That is, roughly speaking, the horizontal threshold-value determination section 33 determines a large threshold value $\epsilon$ when the area to which the pixel of interest belongs is an edge area, determines a medium threshold value $\epsilon$ when the area to which the pixel of interest belongs is a texture area, and determines a small threshold value $\epsilon$ when the area to which the pixel of interest belongs is a flat area or the other area. Furthermore, the greater the smoothed value LPF (V) of the pixel of interest, the larger the threshold value $\epsilon$ the horizontal threshold-value determination section 33 determines.

Similarly to the horizontal threshold-value determination section 33, also, on the basis of the area information of the pixel of interest from the vertical direction parameter selector 32 and on the basis of the smoothed value LPF (V) of the pixel of interest from the low-pass filter 12 (FIG. 1), the vertical threshold-value determination section 34 (FIG. 8) determines a vertical threshold value $\epsilon$ (parameter for filtering in the vertical direction as a noise removal process) with respect to the pixel of interest.

Then, the non-linear smoothing filter 15 (FIG. 1) filters the pixel of interest on the basis of the horizontal threshold value $\epsilon$ with respect to the pixel of interest from the horizontal threshold-value determination section 33 and on the basis of the vertical threshold value $\epsilon$ with respect to the pixel of interest from the vertical threshold-value determination section 34. For example, the non-linear smoothing filter 15 has $\epsilon$ filters at two stages, which are connected in series. For example, the $\epsilon$ filter at the first stage filters the pixel of interest in the horizontal direction on the basis of the horizontal threshold value $\epsilon$ with respect to pixel of interest from the horizontal threshold-value determination section 33. The $\epsilon$ filter at the second stage filters in the vertical direction the pixel of interest output by the $\epsilon$ filter at the first stage on the basis of the vertical threshold value $\epsilon$ with respect to the pixel of interest from the vertical threshold-value determination section 34.

A description will be briefly given below of the $\epsilon$ filter possessed by the non-linear smoothing filter 15. The $\epsilon$ filter sets, on the basis of the threshold value $\epsilon$, the pixel values of the pixels in the vicinity of the pixel of interest, which are used for filtering (low-pass filtering) the pixel of interest, among the pixels constituting the image data.

FIG. 10 illustrates filtering by an $\epsilon$ filter. When the pixel value Xm of the neighboring pixel Pm is not in a range of the threshold value $\epsilon$ in which the pixel value Xn of the pixel Pn of interest is at the center, the $\epsilon$ filter replaces the pixel value Xm of the neighboring pixel Pm with the pixel value Xn of the pixel Pn of interest and uses it to filter the pixel Pn of interest. On the other hand, when the pixel value Xm of the neighboring pixel Pm is in a range of the threshold value $\epsilon$, the $\epsilon$ filter directly uses the pixel value Xm of the neighboring pixel Pm and filters the pixel Pn of interest.

Therefore, according to the $\epsilon$ filter, the pixel of interest is filtered using only the pixel value close to the pixel value of the pixel of interest (the pixel value in the range of the threshold value $\epsilon$). As a result, in the $\epsilon$ filter, for example, when very small noise is contained in the image data serving as input data, a filtered result in which the noise is removed is obtained. Furthermore, in the $\epsilon$ filter, for example, when a sharp edge is contained in the image data serving as input data, a filtered result in which the shape of the edge is maintained is obtained.

Furthermore, according to the $\epsilon$ filter, when the image data serving as input data is to be filtered, the degree of smoothing increases if the threshold value $\epsilon$ is set to a large value, and the degree of smoothing decreases if the threshold value $\epsilon$ is set to a small value.

As a result of filtering the image data by the non-linear smoothing filter 15 having such an $\epsilon$ filter on the basis of the threshold value $\epsilon$ that is determined as described with reference to FIG. 9, mosquito noise that occurs around the edge is removed while the shape of the edge is maintained.

Figure 11:
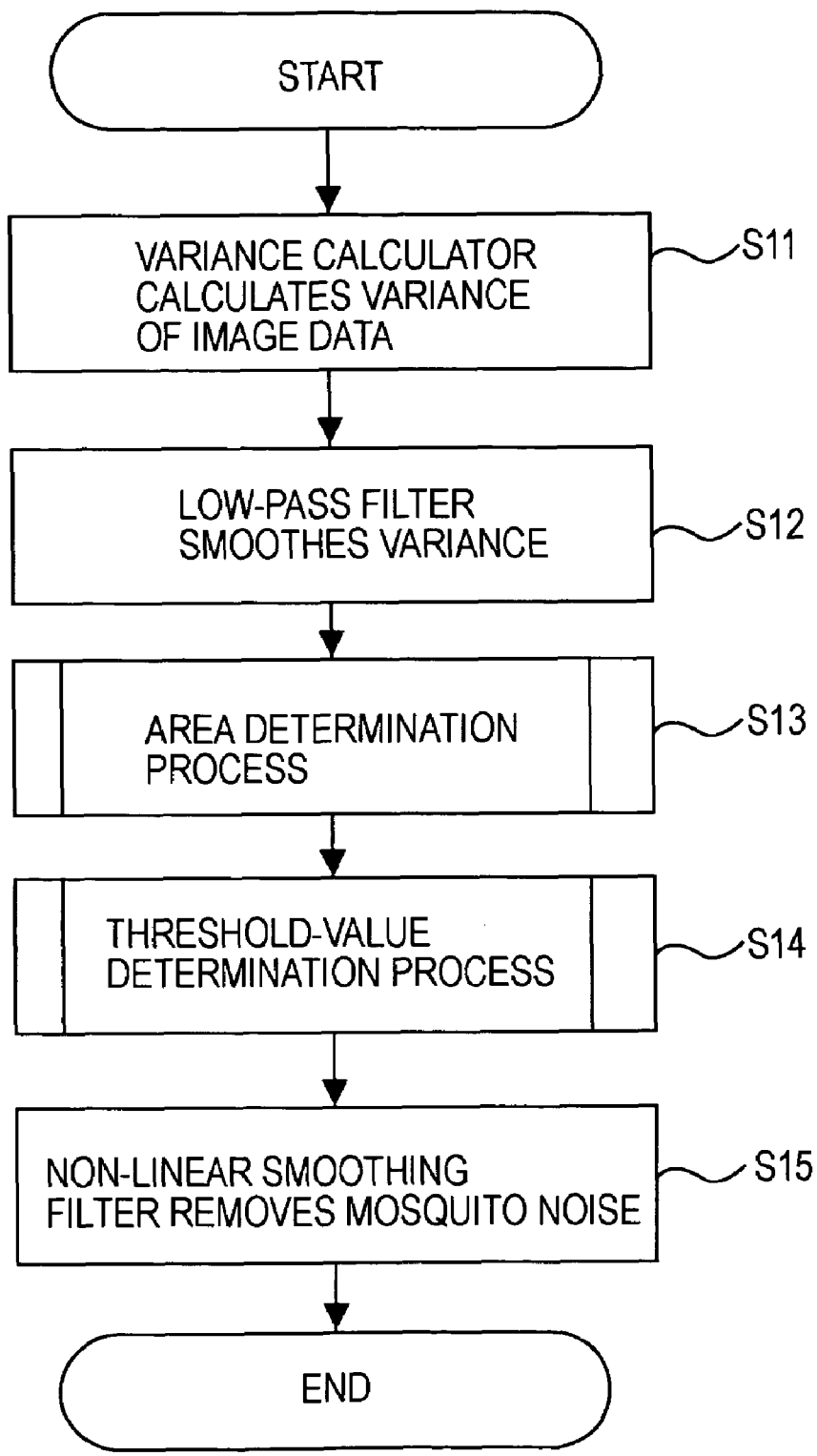
FIG. 11 is a flowchart illustrating processing of a noise removal apparatus 10.

FIG. 11 is a flowchart illustrating processing in which the noise removal apparatus 10 of FIG. 1 removes mosquito noise of image data.

Image data for one frame, used as input data, is input to the variance calculator 11 and the non-linear smoothing filter 15 of the noise removal apparatus 10. In step S11, the variance calculator 11 calculates a variance V for each pixel of the image data. The variance calculator 11 supplies the variance V to the low-pass filter 12, and the process then proceeds to step S12.

In step S12, the low-pass filter 12 smoothes the variance V of the image data from the variance calculator 11 and supplies the smoothed value LPF (V) to the area determination section 13 and the threshold-value determination section 14.

When the smoothed value LPF (V) is supplied from the low-pass filter 12, in step S13, the area determination section 13 performs an area determination process on each pixel constituting the image data on the basis of the smoothed value LPF (V) from the low-pass filter 12. The area determination section 13 supplies the area information obtained as a result of performing the area determination process to the threshold-value determination section 14, and the process then proceeds to step S14.

In step S14, on the basis of the smoothed value LPF (V) from the low-pass filter 12 and the area information from the area determination section 13, the threshold-value determination section 14 performs a threshold-value determination process for determining, for each pixel, a threshold value $\epsilon$, which is a parameter for a noise removal process that is performed by the non-linear smoothing filter 15 and for supplying the determined the threshold value $\epsilon$ to the non-linear smoothing filter 15.

After the processing of step S14, the process proceeds to step S15, where, on the basis of the threshold value $\epsilon$ from the threshold-value determination section 14, the non-linear smoothing filter 15 performs a noise removal process on the image data serving as input data. That is, the non-linear smoothing filter 15 filters the image data and removes mosquito noise contained in the image data and other noise so that image data is smoothed at a degree based on the threshold value $\epsilon$ from the threshold-value determination section 14. The non-linear smoothing filter 15 outputs, as output data, the image data in which mosquito noise and the like are removed, and the processing is then completed.

The processing of FIG. 11 is repeatedly performed by targeting the image data each time image data for one frame is supplied to the noise removal apparatus 10.

Figure 12:
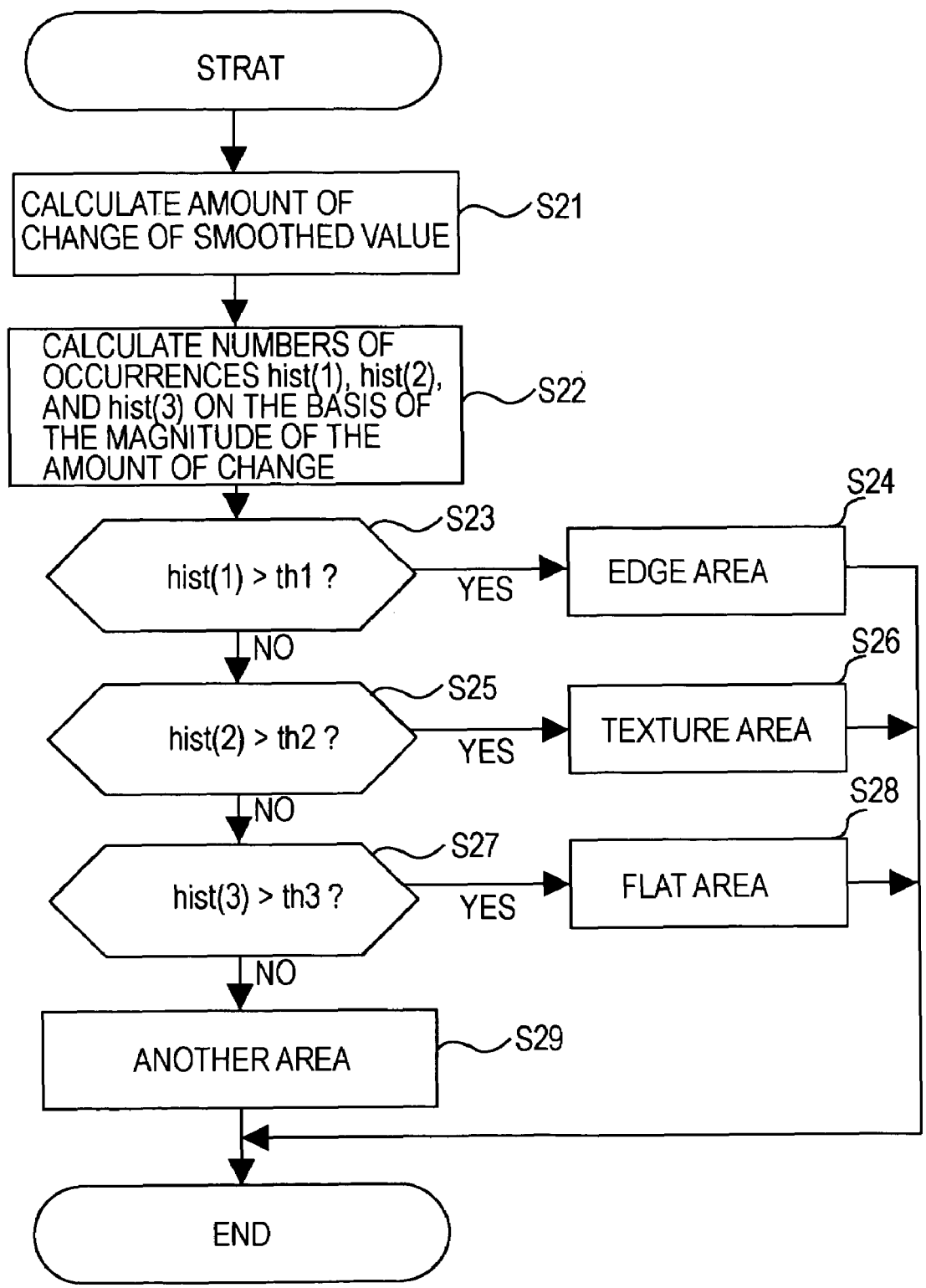
FIG. 12 is a flowchart illustrating an area determination process.

FIG. 12 is a flowchart illustrating an area determination process in step S13 of FIG. 11. In FIG. 12, a description is given of an area determination process to be performed by the horizontal difference calculator 22, the horizontal histogram calculator 24, and the horizontal area determination section 26 within the area determination section 13 (FIG. 4).

The area determination section 13 performs an area determination process by sequentially using, as the pixel of interest, the pixels constituting the image data supplied to the noise removal apparatus 1. That is, in the area determination process, the smoothed values LPF (V) of the 7×5 pixels including the pixel of interest and those positioned in the vicinity of the pixel of interest, that is, the 7×5 pixels of the area of interest (FIG. 5), among the smoothed values LPF (V) supplied from the low-pass filter 12 of FIG. 1 to the area determination section 13, are stored in the memory 21 (FIG. 4).

Then, in step S21, as described with reference to FIG. 5, the horizontal difference calculator 22 calculates a difference value as an amount of change in the horizontal direction of the area of interest and supplies the calculated difference value to the horizontal histogram calculator 24. The process then proceeds to step S22.

In step S22, as described with reference to FIG. 6, the horizontal histogram calculator 24 calculates a histogram of the amount of change in the horizontal direction from the horizontal difference calculator 22, and supplies a histogram composed of three numbers of occurrences hist(1), hist(2), and hist(3) to the horizontal area determination section 26.

After the processing of step S22, the process proceeds to step S23, where the horizontal area determination section 26 compares the number of occurrences hist(1) from the horizontal histogram calculator 24 with the presupplied threshold value th1 in order to determine whether or not the number of occurrences hist(1) is greater than the threshold value th1.

When it is determined by the horizontal area determination section 26 in step S23 that the number of occurrences hist(1) is greater than the threshold value th1, the process proceeds to step S24, where the horizontal area determination section 26 supplies area information in the horizontal direction indicating that the area to which the pixel of interest belongs is an edge area to the threshold-value determination section 14 (FIG. 1). The processing is then completed.

On the other hand, when it is determined by the horizontal area determination section 26 in step S23 that the number of occurrences hist(1) is smaller than or equal to the threshold value th1, the process proceeds to step S25.

In step S25, the horizontal area determination section 26 compares the number of occurrences hist(2) from the horizontal histogram calculator 24 with the presupplied threshold value th2 and determines whether or not the number of occurrences hist(2) is greater than the threshold value th2.

When it is determined by the horizontal area determination section 26 in step S25 that the number of occurrences hist(2) is greater than the threshold value th2, the process proceeds to step S26, where the horizontal area determination section 26 supplies area information in the horizontal direction indicating that the area to which the pixel of interest belongs is a texture area to the threshold-value determination section 14. The processing is then completed.

On the other hand, when it is determined by the horizontal area determination section 26 in step S25 that the number of occurrences hist(2) is smaller than or equal to the threshold value th2, the process proceeds to step S27.

In step S27, the horizontal area determination section 26 compares the number of occurrences hist(3) from the horizontal histogram calculator 24 with the presupplied threshold value th3 and determines whether or not the number of occurrences hist(3) is greater than the threshold value th3.

When it is determined by the horizontal area determination section 26 in step S27 that the number of occurrences hist(3) is greater than the threshold value th3, the process proceeds to step S28, where the horizontal area determination section 26 supplies area information in the horizontal direction indicating that the area to which the pixel of interest belongs is a flat area to the threshold-value determination section 14. The processing is then completed.

On the other hand, when it is determined by the horizontal area determination section 26 in step S27 that the number of occurrences hist(3) is smaller than or equal to the threshold value th3, the process proceeds to step S29, where the horizontal area determination section 26 supplies area information in the horizontal direction indicating that the area to which the pixel of interest belongs is the other area to the threshold-value determination section 14. The processing is then completed.

The above description refers to the area determination process that is performed in the horizontal direction by the horizontal difference calculator 22, the horizontal histogram calculator 24, and the horizontal area determination section 26. The identical area determination process is also performed in the vertical direction by the vertical difference calculator 23, the vertical histogram calculator 25, and the vertical area determination section 27, and the area information in the vertical direction is supplied to the threshold-value determination section 14.

Figure 13:
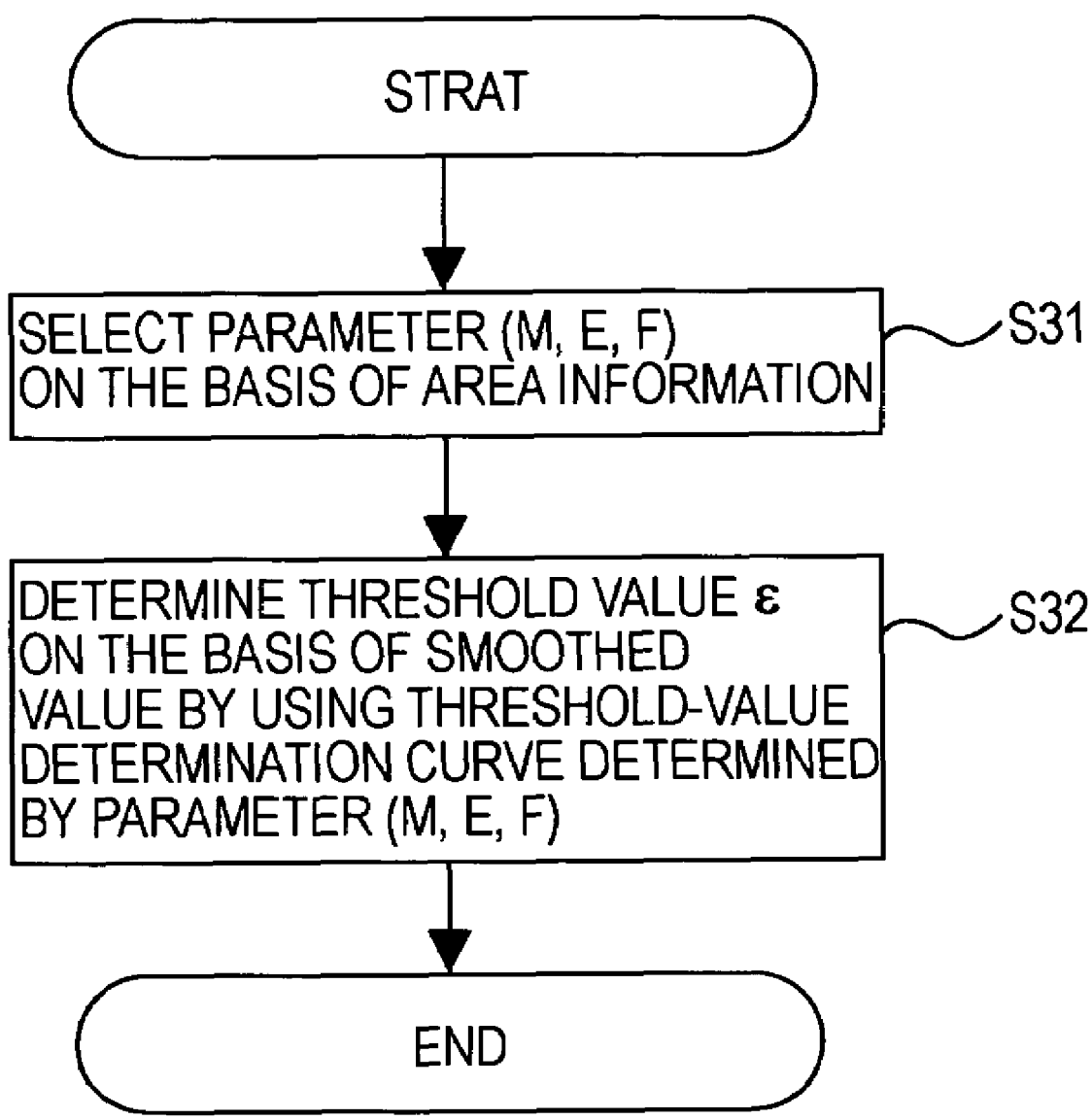
FIG. 13 is a flowchart illustrating a threshold-value determination process.

FIG. 13 is a flowchart illustrating a threshold-value determination process in step S14 of FIG. 11. In FIG. 13, a threshold-value determination process that is performed in the horizontal direction by the horizontal direction parameter selector 31 and the horizontal threshold-value determination section 33 within the threshold-value determination section 14 (FIG. 8) is described.

When the area information in the horizontal direction of the pixel of interest is supplied from the horizontal area determination section 26 of FIG. 4 to the horizontal direction parameter selector 31 of FIG. 8, in step S31, on the basis of the area information in the horizontal direction from the horizontal area determination section 26, the horizontal direction parameter selector 31 selects a determining parameter for determining a threshold-value determination curve.

For example, as described with reference to FIG. 9, when the area information in the horizontal direction from the horizontal area determination section 26 indicates an edge area, the horizontal direction parameter selector 31 selects the determining parameters $E_1$, $F_1$, and $M_1$. When the area information in the horizontal direction from the horizontal area determination section 26 indicates a texture area, the horizontal direction parameter selector 31 selects the determining parameters $E_2$, $F_2$, and $M_2$. When the area information in the horizontal direction from the horizontal area determination section 26 indicates a flat area or the other area, the horizontal direction parameter selector 31 selects the determining parameters $E_3$, $F_3$, and $M_3$.

The horizontal direction parameter selector 31 supplies the determining parameter to the horizontal threshold-value determination section 33, and the process then proceeds to step S32.

In step S32, on the basis of the determining parameter output from the horizontal direction parameter selector 31, the horizontal threshold-value determination section 33 determines a threshold-value determination curve used to determine the threshold value $\epsilon$, and determines a value corresponding to the smoothed value LPF (V) of the pixel of interest in the threshold-value determination curve, which is supplied from the low-pass filter 12 of FIG. 1, as the horizontal threshold value $\epsilon$ of the pixel of interest.

Then, the horizontal threshold-value determination section 33 supplies the horizontal threshold value $\epsilon$ to the non-linear smoothing filter 15 of FIG. 1. The processing is then completed.

The above description refers to the threshold-value determination process that is performed in the horizontal direction by the horizontal direction parameter selector 31 and the horizontal direction threshold value 33. The identical threshold-value determination process is also performed in the vertical direction by the vertical direction parameter selector 32 and the vertical threshold-value determination section 34 on the basis of the determining parameter from the vertical direction parameter selector 32 of FIG. 8. The vertical threshold value $\epsilon$ of the pixel of interest, which is obtained by the threshold-value determination process, is supplied to the non-linear smoothing filter 15.

In the manner described above, on the basis of the area information as the determination result by the area determination process, as a result of determining the threshold value $\epsilon$ by the threshold-value determination process, in the non-linear smoothing filter 15, filtering based on the threshold value $\epsilon$ appropriate for the area to which each pixel of the image data belongs and based on the threshold value ε in accordance with the degree of variance of the pixel values in the vicinity of each pixel is performed. As a result, mosquito noise and the like contained in the image data can be effectively removed.

That is, in the related art, as a method for removing mosquito noise, a method for performing filtering using first-order differentiation and a Sobel filter has been known. However, in this method, it has been difficult to appropriately separate an edge area and a texture area from each other and to perform filtering. In comparison, according to the noise removal apparatus 10 of FIG. 1, an edge area, a texture area, and a flat area are appropriately separated from one another, and the threshold value ε is determined dynamically in response to the degree of variance of the pixel values in accordance with the threshold-value determination curve based on each area of the edge area, the texture area, and the flat area. As a consequence, noise can be effectively removed.

More specifically, as described with reference to FIG. 9, with respect to the pixels belonging to the edge area, the threshold value ε is determined to be a comparatively large value in accordance with the threshold-value determination curve $L_1$. Therefore, the non-linear smoothing filter 15 filters the pixels in the edge area (for example, the range of the image data corresponding to the range "d" of FIG. 3) at a high degree of smoothing. Therefore, mosquito noise that occurs around the edge of the image data can be removed.

With respect to the pixels belonging to the texture area, the threshold value ε is determined to be a medium value smaller than the threshold value ε for the pixels belonging to the edge area in accordance with the threshold-value determination curve $L_2$. Therefore, the non-linear smoothing filter 15 filters the pixels of the texture area (for example, the range of the image data corresponding to the range "e" of FIG. 3) at a degree of smoothing lower than the degree of smoothing for the pixels of the edge area. Therefore, storage of very small changes of pixel values as texture is possible, for example, deterioration of image quality of a pattern on the surface of an object can be prevented.

Furthermore, with respect to the pixels belonging to the flat area, the threshold value ε is determined to be a small value smaller than the threshold value ε for the pixels belonging to the texture area. Therefore, the non-linear smoothing filter 15 filters the pixels of the flat area (for example the range of the image data corresponding to the range "f" of FIG. 3) at a degree of smoothing lower than the degree of smoothing for the pixels of the texture area. As a consequence, very small noise present in the flat area can be removed.

Next, in the noise removal apparatus 10 of FIG. 1, by using the variance V of the pixel values of 3×3 pixels in the length and breadth as the variance information of the pixel of interest, both processing in the horizontal direction (the area determination process (FIG. 12), the threshold-value determination process (FIG. 13), and processing that is performed in the horizontal direction within the noise removal process) and processing in the vertical direction (the area determination process (FIG. 12), the threshold-value determination process (FIG. 13), and processing that is performed in the vertical direction within the noise removal process) are performed. With respect to the pixel of interest, variance information in the horizontal direction and vertical variance information are determined. Processing in the horizontal direction can be performed using the variance information in the horizontal direction, and processing in the vertical direction can be performed using the vertical variance information.

Figure 14:
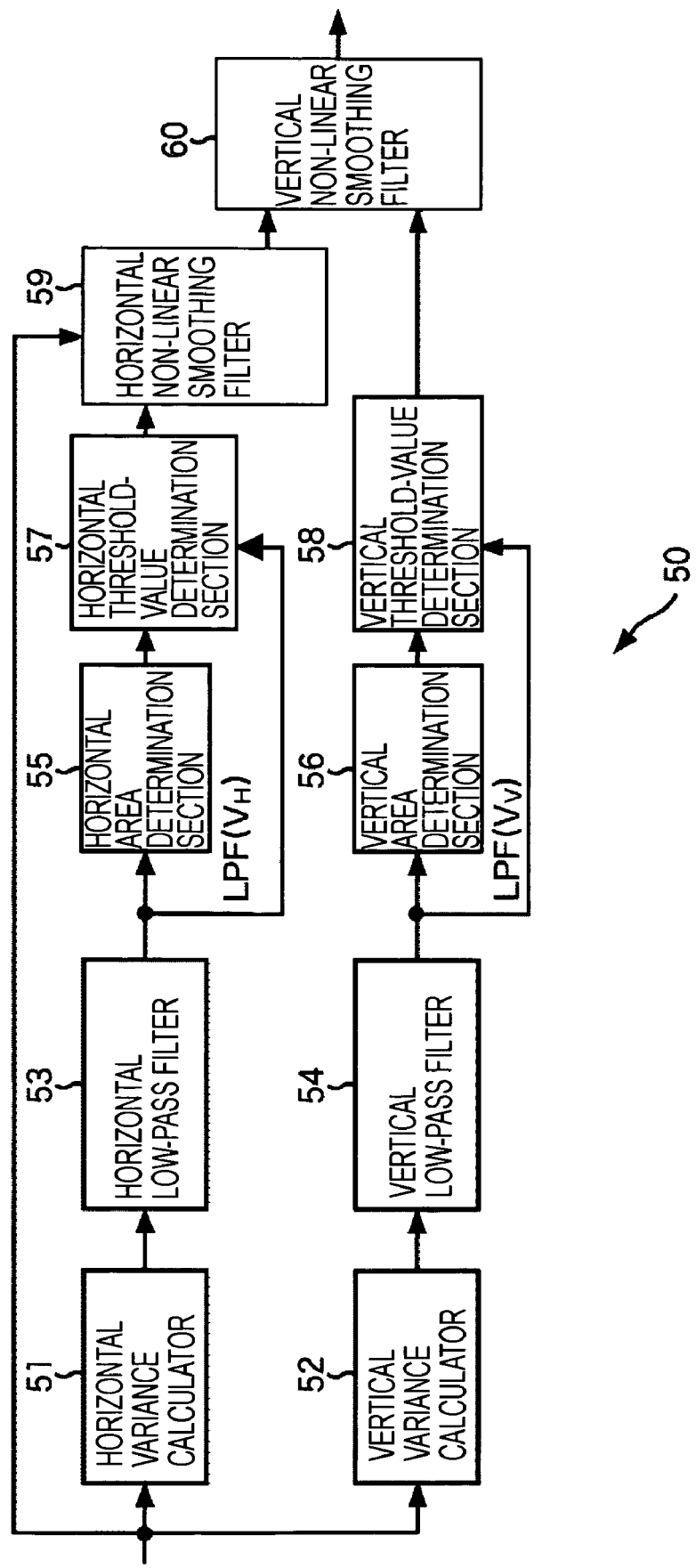
FIG. 14 is a block diagram showing an example of the configuration of another embodiment of a noise removal apparatus to which the present invention is applied.

FIG. 14 is a block diagram showing an example of the configuration of another embodiment of the noise removal apparatus to which the present invention is applied.

In FIG. 14, a noise removal apparatus 50 includes a horizontal variance calculator 51, a vertical variance calculator 52, a horizontal low-pass filter 53, a vertical low-pass filter 54, a horizontal area determination section 55, a vertical area determination section 56, a horizontal threshold-value determination section 57, a vertical threshold-value determination section 58, a horizontal non-linear smoothing filter 59, and a vertical non-linear smoothing filter 60.

Similarly to the variance calculator 11 of FIG. 1, image data serving as input data is input to the horizontal variance calculator 51 and the vertical variance calculator 52. The horizontal variance calculator 51 calculates the variance information in the horizontal direction with respect to the pixel of interest, for example, a horizontal variance $V_H$. The vertical variance calculator 52 calculates the variance information in the vertical direction with respect to the pixel of interest, for example, a horizontal variance $V_V$.

At this time, it is possible for the horizontal variance calculator 51 and the vertical variance calculator 52 to determine the variance by using different numbers of pixels (pixel values) correspondingly. The horizontal variance calculator 51 calculates the horizontal variance $V_H$ with respect to the pixel of interest in accordance with equation (1) described above by using, for example, five pixels (tap), in the horizontal direction in which the pixel of interest is at the center. The vertical variance calculator 52 calculates the vertical variance $V_V$ with respect to the pixel of interest in accordance with equation (1) described above by using, for example, three pixels (tap), in the vertical direction in which the pixel of interest is at the center. The variance $V_H$ in the horizontal direction and the variance $V_V$ in the vertical direction can also be determined by using the same number of pixels.

Then, the horizontal variance calculator 51 supplies the horizontal variance $V_H$ with respect to the pixel of interest to the horizontal low-pass filter 53. The vertical variance calculator 52 supplies the vertical variance $V_V$ with respect to the pixel of interest to the vertical low-pass filter 54.

The horizontal low-pass filter 53 smoothes the horizontal variance $V_H$ with respect to pixel of interest from the horizontal variance calculator 5. The horizontal low-pass filter 53 supplies the smoothed value LPF ($V_H$) in the horizontal direction with respect to the pixel of interest obtained by horizontally smoothing the variance $V_H$ in the horizontal direction with respect to the pixel of interest, to the horizontal area determination section 55 and the horizontal threshold-value determination section 57.

The vertical low-pass filter 54 smoothes the vertical variance $V_V$ with respect to the pixel of interest from the vertical variance calculator 5. The vertical low-pass filter 54 supplies the smoothed value LPF ($V_V$) in the vertical direction with respect to the pixel of interest, which is obtained by smoothing the vertical variance $V_V$ in the vertical direction, to the vertical area determination section 56 and the vertical threshold-value determination section 58.

The horizontal area determination section 55 is common to the area determination section 13 of FIG. 4 in that the memory 21, the horizontal difference calculator 22, the horizontal histogram calculator 24, and the horizontal area determination section 26 (neither of which is shown) of FIG. 4 are provided. However, the horizontal area determination section 55 differs from the area determination section 13 of FIG. 4 in that the vertical difference calculator 23, the vertical histogram calculator 25, and the vertical area determination section 27 are not provided.

Similarly to the area determination section 13, on the basis of the smoothed value LPF ($V_H$) in the horizontal direction with respect to the pixel of interest from the horizontal low-pass filter 53, the horizontal area determination section 55 performs an area determination process in the horizontal direction as to which one of the edge area, the texture area, the flat area, and the other area the area to which the pixel belongs is with respect to each pixel constituting the image data. Then, the horizontal area determination section 55 supplies the area information in the horizontal direction with respect to the pixel of interest, which is obtained as a result of performing the area determination process in the horizontal direction, to the horizontal threshold-value determination section 57.

The vertical area determination section 56 is common to the area determination section 13 of FIG. 4 in that the memory 21, the vertical difference calculator 23, the vertical histogram calculator 25, and the vertical area determination section 27 (neither of which is shown) of FIG. 4 are provided. However, the vertical area determination section 56 differs from the area determination section 13 of FIG. 4 in that the horizontal difference calculator 22, the horizontal histogram calculator 24, and the horizontal area determination section 26 are not provided.

Then, similarly to the area determination section 13 of FIG. 4, the vertical area determination section 56 performs an area determination process in the vertical direction for determining which one of the edge area, the texture area, the flat area, and the other area each of the pixels constituting the image data belongs on the basis of the smoothed value LPF ($V_V$) in the vertical direction with respect to the pixel of interest from the vertical low-pass filter 54. Then, the vertical area determination section 56 supplies the area information in the vertical direction with respect to the pixel of interest, which is obtained as a result of performing the area determination process in the vertical direction, to the vertical threshold-value determination section 58.

The horizontal threshold-value determination section 57 is common to the threshold-value determination section 14 of FIG. 8 in that horizontal direction parameter selector 31 and the horizontal threshold-value determination section 33 (neither of which is shown) of FIG. 8 are provided. However, the horizontal threshold-value determination section 57 differs from the threshold-value determination section 14 of FIG. 8 in that the vertical direction parameter selector 32 and the vertical threshold-value determination section 34 are not provided.

Similarly to the threshold-value determination section 14 of FIG. 8, on the basis of the smoothed value LPF ($V_H$) in the horizontal direction with respect to the pixel of interest from the horizontal low-pass filter 53 and the area information in the horizontal direction with respect to the pixel of interest from the horizontal area determination section 55, the horizontal threshold-value determination section 57 determines the threshold value $\epsilon$ in the horizontal direction with respect to the pixel of interest and supplies the determined threshold value $\epsilon$ to the horizontal non-linear smoothing filter 59.

The vertical threshold-value determination section 58 is common to the threshold-value determination section 14 of FIG. 8 in that the vertical direction parameter selector 32 and the vertical threshold-value determination section 34 of FIG. 8 are provided. However, the vertical threshold-value determination section 58 differs from the threshold-value determination section 14 of FIG. 8 in that the horizontal direction parameter selector 31 and the horizontal threshold-value determination section 33 are not provided.

Then, similarly to the threshold-value determination section 14 of FIG. 8, the vertical threshold-value determination section 58 determines the vertical threshold value $\epsilon$ with respect to the pixel of interest on the basis of the smoothed value LPF ($V_V$) in the vertical direction with respect to the pixel of interest from the vertical low-pass filter 54 and the area information in the vertical direction with respect to the pixel of interest from the vertical area determination section 56, and supplies the determined threshold value $\epsilon$ to the vertical non-linear smoothing filter 60.

Image data serving as input data is supplied to the horizontal non-linear smoothing filter 59, and the horizontal threshold value $\epsilon$ with respect to the pixel of interest is supplied thereto from the horizontal threshold-value determination section 57. The horizontal non-linear smoothing filter 59, which is, for example, an $\epsilon$ filter, filters the image data in the horizontal direction and supplies the filtered image data to the vertical non-linear smoothing filter 60 so that the pixel of interest is smoothed at a degree based on the horizontal threshold value $\epsilon$ with respect to the pixel of interest from the horizontal threshold-value determination section 57.

The image data that is filtered in the horizontal direction by the horizontal non-linear smoothing filter 59 is supplied from the vertical non-linear smoothing filter 60, and the vertical threshold value $\epsilon$ with respect to the pixel of interest is supplied thereto from the vertical threshold-value determination section 58. The vertical non-linear smoothing filter 60 is, for example, an $\epsilon$ filter, and filters the image data in the vertical direction so that the pixel of interest is smoothed at a degree based on the vertical threshold value $\epsilon$ with respect to the pixel of interest from the vertical threshold-value determination section 58.

In the manner described above, in the noise removal apparatus 50, the horizontal variance $V_H$ and the vertical variance $V_V$ with respect to the pixel of interest are determined from the image data serving as input data. Then, processing in the horizontal direction is performed using the horizontal variance $V_H$, and processing in the vertical direction is performed using the vertical variance $V_V$.

In the manner described above, as a result of using the horizontal variance $V_H$ for the processing in the horizontal direction and using the vertical variance $V_V$ for the processing in the vertical direction, when compared to the case in which the same variance V is used for the processing in the horizontal direction and the processing in the vertical direction as in the noise removal-apparatus 10 of FIG. 1, it is possible to obtain a horizontal threshold value $\epsilon$ more suitable for filtering in the horizontal direction and a vertical threshold value $\epsilon$ more suitable for filtering in the vertical direction.

For example, in pixels in the vicinity of a point of intersection at which fine lines intersect, the tendency in which the horizontal variance $V_H$ differs from the vertical variance $V_V$ is high. According to the noise removal apparatus 50, in particular, when a portion in the vicinity of a point of intersection at which fine lines intersect is to be filtered, filtering can be performed using the threshold value $\epsilon$ in the horizontal direction suitable for filtering in the horizontal direction and the threshold value $\epsilon$ in the vertical direction suitable for filtering in the vertical direction. When compared to the case in the noise removal apparatus 10 of FIG. 1, noise can be more effectively removed.

In the noise removal apparatuses 10 and 50, on the basis of the area information with respect to the pixel of interest, the threshold value $\epsilon$ used in the $\epsilon$ filter is determined as a parameter for the noise removal process. For the parameter for the noise removal process, in addition, for example, a tap coefficient for a filter for performing filtering as a noise removal process can also be determined.

In this embodiment, as a non-linear smoothing filter for performing a noise removal process, an ∈ filter is used. Alternatively, for the non-linear smoothing filter, another filter, for example, a filter capable of controlling the level of noise to be smoothed in accordance with a threshold value (hereinafter referred to as an "M filter" as appropriate), can be used. The details of the M filter are described in, for example, Japanese Unexamined Patent Application Publication No. 2004-289607.

For example, when the pixel of interest is to be filtered, the M filter determines a plurality of types smoothed values by performing weighted averaging of neighboring pixels including the pixel of interest by using a plurality of types of tap coefficients, computes a weight for the plurality of types of smoothed values on the basis of a result in which a difference value between the pixel value of the pixel of interest and the pixel values of the pixels used for a weighted average is compared with a predetermined threshold value, and combines the plurality of types of smoothed values. As described above, as a result of combining a plurality of types of smoothed values in accordance with a weight based on a threshold value, it is possible for the M filter to control the level of noise to be smoothed by using a threshold value.

In such an M filter, by using a threshold value determined on the basis of the area information for the pixel of interest, a plurality of types of smoothed values are combined in accordance with a weight based on the threshold value in response to each area of the edge area, the texture area, and the flat area, and a noise removal process in response to each area can be performed.

In the noise removal apparatuses 10 and 50, regardless of whether an image is a moving image or a still image, for example, (data of) a still image in which image data encoded by an MPEG system is decoded, and (data of) a moving image in which image data encoded by a JPEG system, can be made to be an object for the noise removal process.

Although the series of processes described in the foregoing can be performed by hardware, it can also be executed by software. When the series of processes is to be performed by software, programs forming the software are installed into a general-purpose computer, etc.

Figure 15:
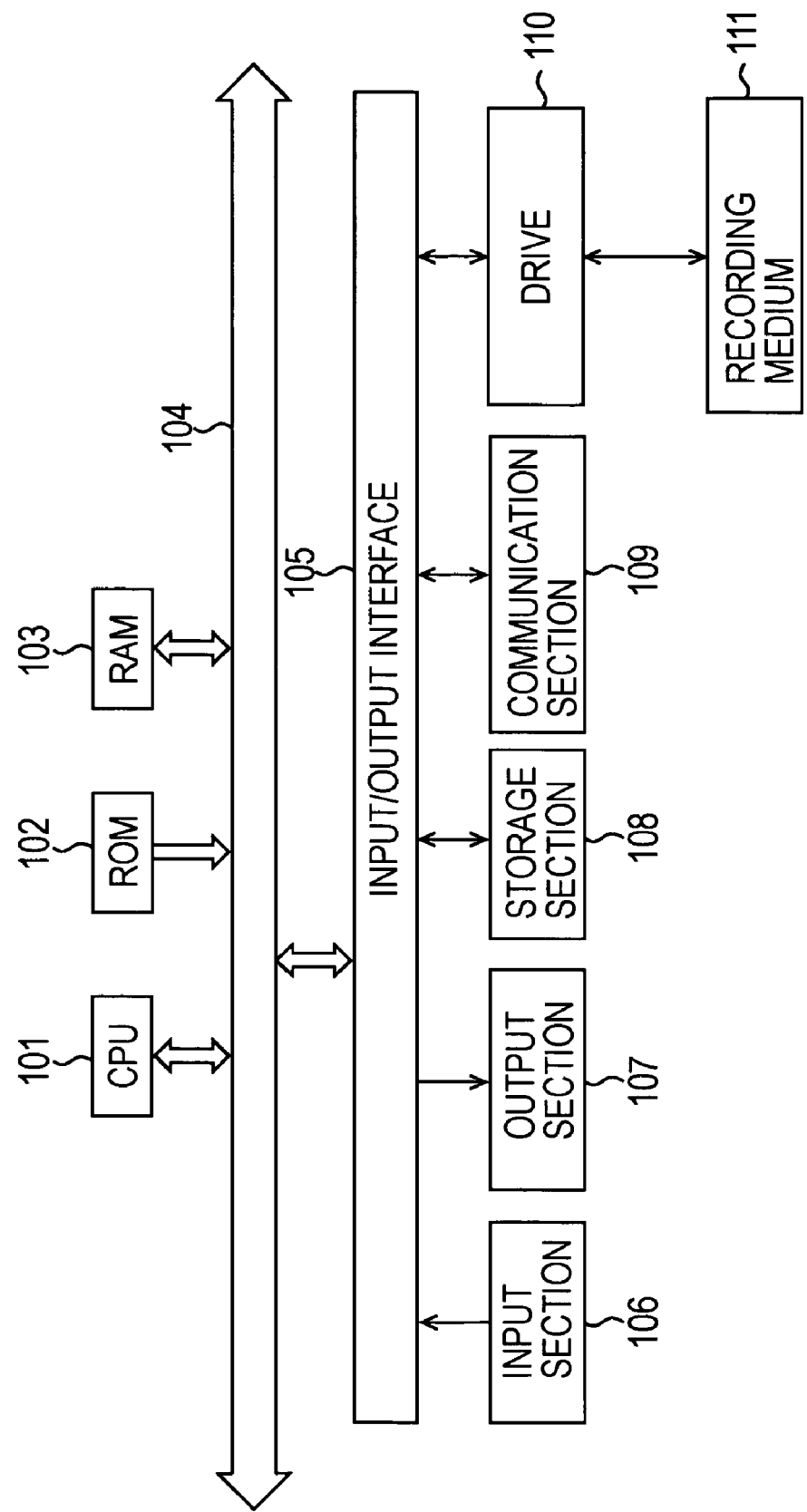
FIG. 15 is a block diagram showing an example of the configuration of an embodiment of a computer in which a program for implementing a noise removal apparatus is installed.

FIG. 15 shows an example of the configuration of an embodiment of a computer in which a program for executing the above-described series of processes is installed.

The computer includes a CPU (Central Processing Unit) 101, a ROM (Read Only Memory) 102, a RAM (Random Access Memory) 103, an internal bus 104, an input/output interface 105, an input section 106, an output section 107, a storage section 108, a communication section 109, and a drive 110.

The CPU 101, the ROM 102, and the RAM 103 are interconnected with one another via the internal bus 104. An input/output interface 105 is further connected to the internal bus 104.

The CPU 101 performs various kinds of processing in accordance with a program stored in the ROM 102 or in accordance with a program loaded into the RAM 103. In the RAM 103, for example, data necessary for the CPU 101 to perform various kinds of processing is stored as appropriate.

The input section 106 including a keyboard, and a mouse; an output section 107 including an LCD (Liquid Crystal Display), a CRT (Cathode Ray Tube) and the like; a storage section 108 including a hard disk; a communication section 109 including a modem, a terminal adaptor, a communication interface, and the like; and a drive 110 is connected to the input/output interface 105.

A recording medium 111 formed of a magnetic disk, an optical disc, a magneto-optical disc, or a semiconductor memory is loaded into the drive 110 as appropriate.

Programs to be executed by the CPU 101 can be stored (recorded) in advance in the ROM 102 and the storage section 108. The recording medium 111 in which programs are recorded can be provided as so-called packaged software. The programs are read by the drive 110 from the recording medium 111 and are installed into the storage section 108. Furthermore, programs can be transferred wirelessly from a download site via an artificial satellite for digital satellite broadcasting to the communication section 109 or can be transferred by wire to the communication section 109 via a network such as a LAN (Local Area Network) or the Internet. The programs are supplied from the communication section 109 to the storage section 108, whereby they are installed.

When an instruction for allowing the output section 107 to play back image data stored in the storage section 108 is input as a result of operating the input section 106 by a user, the computer configured in this manner enables, in response to the instruction, the CPU 101 to execute the program stored in the ROM 102 or the program loaded from the storage section 108 to the RAM 103.

As a result, the CPU 101 performs processing in accordance with the above-described flowcharts or processing to be performed according to the structure of the block diagrams. Then, the CPU 101 enables the output section 107 to display, as a processed result, image data (image) in which noise is removed, via the input/output interface 105.

The above processes described with reference to the flowcharts do not have to be executed chronologically according to the written orders in flowcharts, and they may include processes which are executed concurrently or individually (for example, concurrent processes or object-oriented processes).

The programs may be processed by one computer, and may also be processed in a distributed manner by a plurality of computers. Furthermore, the programs may be transferred to a distant computer, whereby the programs are executed.

It should be understood by those skilled in the art that various modifications, combinations, sub-combinations and alterations may occur depending on design requirements and other factors insofar as they are within the scope of the appended claims or the equivalents thereof.

What is claimed is:

1. A data processing apparatus for processing image data, the data processing apparatus comprising:
   variance information calculation means for calculating variance information indicating the degree of variance of pixel values for each of a plurality of pixels constituting the image data;
   smoothing means for smoothing the variance information and for outputting a smoothed value;
   determination means for determining an area to which the pixel belongs on the basis of the smoothed value and for outputting area information indicating the area;
   parameter determination means for determining a parameter for a noise removal process for each of the pixels constituting the image data on the basis of the area information and the smoothed value; and
   noise removal means for performing the noise removal process on the image data on the basis of the parameter determined for each of the pixels.

2. The data processing apparatus according to claim 1, wherein the determination means comprises:
   amount of change calculation means for calculating the amount of changes in the smoothed values of pixels including a pixel of interest and those positioned in the vicinity of the pixel of interest among the pixels constituting the image data;

histogram calculation means for calculating a histogram of the amount of changes; and area determination means for determining an area to which the pixel belongs on the basis of the histogram.

3. The data processing apparatus according to claim 1, wherein the determination means makes a determination as to which one of an edge area, a texture area, and a flat area the pixel belongs.

4. A data processing method for processing image data, the data processing method comprising at least one processor implementing the steps of:

calculating variance information indicating the degree of variance of pixel values for each of a plurality of pixels constituting the image data;

smoothing the variance information and outputting a smoothed value;

determining an area to which the pixel belongs on the basis of the smoothed value and outputting area information indicating the area;

determining a parameter for a noise removal process for each of the pixels constituting the image data on the basis of the area information and the smoothed value; and performing the noise removal process on the image data on the basis of the parameter determined for each of the pixels.

5. A computer readable medium storing a program for enabling a computer to perform data processing for processing image data, the program comprising the steps of:

calculating variance information indicating the degree of variance of pixel values for each of a plurality of pixels constituting the image data;

smoothing the variance information and outputting a smoothed value;

determining an area to which the pixel belongs on the basis of the smoothed value and outputting area information indicating the area;

determining a parameter for a noise removal process for each of the pixels constituting the image data on the basis of the area information and the smoothed value; and performing the noise removal process on the image data on the basis of the parameter determined for each of the pixels.

6. A data processing apparatus for processing image data, the data processing apparatus comprising:

a variance information calculator configured to calculate variance information indicating the degree of variance of pixel values for each of a plurality of pixels constituting the image data;

a smoothing section configured to smooth the variance information and to output a smoothed value;

a determination section configured to determine an area to which the pixel belongs on the basis of the smoothed value and to output area information indicating the area;

a parameter determination section configured to determine a parameter for a noise removal process for each of the pixels constituting the image data on the basis of the area information and the smoothed value; and a noise removal section configured to perform the noise removal process on the image data on the basis of the parameter determined for each of the pixels.

* * * * *

UNITED STATES PATENT AND TRADEMARK OFFICE
CERTIFICATE OF CORRECTION

PATENT NO.       : 7,657,114 B2                                          Page 1 of 1
APPLICATION NO.  : 11/504041
DATED            : February 2, 2010
INVENTOR(S)      : Moon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 780 days.

Signed and Sealed this

Thirtieth Day of November, 2010

David J. Kappos
*Director of the United States Patent and Trademark Office*